United States Patent
Tsai et al.

(10) Patent No.: US 12,056,922 B2
(45) Date of Patent: Aug. 6, 2024

(54) EVENT NOTIFICATION SYSTEM

(71) Applicant: Samsara Inc., San Francisco, CA (US)

(72) Inventors: Evaline Shin-Tin Tsai, Cupertino, CA (US); Kieran K. Gupta, San Francisco, CA (US); Margaret Irene Finch, San Francisco, CA (US); Matthew Lee Basham, Oakland, CA (US); Bodecker John DellaMaria, San Francisco, CA (US); Brian Tuan, Cupertino, CA (US); James Chen, San Francisco, CA (US); Jason Noah Laska, San Francisco, CA (US); Jason Frederic Symons, Dublin, CA (US); John Charles Bicket, San Francisco, CA (US); Kavya Joshi, San Francisco, CA (US); Ryan Reading, San Francisco, CA (US); Sabrina Quinn Shemet, San Francisco, CA (US); Sean Kyungmok Bae, San Francisco, CA (US); Ishaan Kansal, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 51 days.

(21) Appl. No.: 16/794,106

(22) Filed: Feb. 18, 2020

(65) Prior Publication Data
US 2020/0342230 A1 Oct. 29, 2020

Related U.S. Application Data

(63) Continuation-in-part of application No. 16/395,927, filed on Apr. 26, 2019, now Pat. No. 11,080,568.

(51) Int. Cl.
*G06V 20/20* (2022.01)
*G06V 20/40* (2022.01)
(Continued)

(52) U.S. Cl.
CPC .............. *G06V 20/20* (2022.01); *G06V 20/46* (2022.01); *G08G 1/163* (2013.01); *G06V 20/44* (2022.01); *G06V 20/582* (2022.01); *G06V 20/597* (2022.01)

(58) Field of Classification Search
CPC ...... G08G 1/163; G08G 1/012; G08G 1/0129; G08G 1/0133; G08G 1/0141; G08G 1/04;
(Continued)

(56) References Cited

U.S. PATENT DOCUMENTS 9,137,498 B1    9/2015   L'heureux et al.
9,990,553 B1 *   6/2018   Chan ...................... G06Q 40/08
(Continued)

OTHER PUBLICATIONS

U.S. Appl. No. 16/395,927, filed Apr. 26, 2019, Object-Model Based Event Detection System.
(Continued)

*Primary Examiner* — Solomon G Bezuayehu
(74) *Attorney, Agent, or Firm* — Schwegman Lundberg & Woessner, P.A.

(57) ABSTRACT

An event detection system to operations that include: detecting an event based on at least a portion of the sensor data, the event comprising a plurality of event attributes; determining one or more event attributes from the plurality of event attributes of the event transgress a threshold value; and causing display of a notification that includes a presentation of at least the portion of the sensor data in response to the determining that the one or more event attributes from among the plurality of event attributes of the event transgress the threshold value.

18 Claims, 17 Drawing Sheets

(51) Int. Cl.
*G08G 1/16* (2006.01)
*G06V 20/58* (2022.01)
*G06V 20/59* (2022.01)

(58) Field of Classification Search
CPC ........ G08G 1/165; G08G 1/167; G08G 1/166; G06V 20/20; G06V 20/46; G06V 20/44; G06V 20/582; G06V 20/597; G06K 9/00671; G06K 9/00744; G06K 9/00845; G06K 9/00818; G06K 2009/00738
See application file for complete search history.

(56) References Cited

U.S. PATENT DOCUMENTS

| | | | |
|---|---|---|---|
| 10,037,606 B2* | 7/2018 | Sakai | G08B 13/19602 |
| 10,037,711 B2* | 7/2018 | Chauncey | B60W 50/14 |
| 10,196,071 B1* | 2/2019 | Rowson | G09B 19/167 |
| 10,360,636 B1* | 7/2019 | Kraft | G07C 5/008 |
| 10,573,183 B1* | 2/2020 | Li | G07C 5/008 |
| 10,623,899 B2 | 4/2020 | Watkins et al. | |
| 10,997,430 B1 | 5/2021 | Slavin | |
| 11,080,568 B2 | 8/2021 | Elhattab et al. | |
| 11,100,767 B1 | 8/2021 | Lee et al. | |
| 2005/0286774 A1 | 12/2005 | Porikli | |
| 2006/0092015 A1 | 5/2006 | Agrawal et al. | |
| 2006/0092874 A1 | 5/2006 | Agrawal et al. | |
| 2006/0207818 A1 | 9/2006 | Fujioka et al. | |
| 2009/0141939 A1 | 6/2009 | Chambers et al. | |
| 2010/0087984 A1* | 4/2010 | Joseph | G09B 19/16 701/31.4 |
| 2010/0278271 A1 | 11/2010 | MacInnis | |
| 2011/0043689 A1 | 2/2011 | Cobb et al. | |
| 2011/0234749 A1 | 9/2011 | Alon | |
| 2012/0026334 A1 | 2/2012 | Kamada et al. | |
| 2012/0218416 A1 | 8/2012 | Leny et al. | |
| 2013/0147686 A1 | 6/2013 | Clavin et al. | |
| 2013/0302758 A1 | 11/2013 | Wright | |
| 2014/0012492 A1 | 1/2014 | Bowers et al. | |
| 2014/0146182 A1* | 5/2014 | Endo | G06T 7/254 348/169 |
| 2014/0226010 A1 | 8/2014 | Molin | H04N 7/01 340/576 |
| 2014/0266694 A1* | 9/2014 | McCluskey | G08B 21/0453 340/539.12 |
| 2015/0116114 A1* | 4/2015 | Boyles | G08B 25/00 340/539.17 |
| 2015/0317841 A1* | 11/2015 | Karsch | G06V 20/52 348/149 |
| 2016/0093212 A1* | 3/2016 | Barfield, Jr. | H04N 7/181 348/144 |
| 2016/0101728 A1 | 4/2016 | Chan | |
| 2016/0119553 A1 | 4/2016 | Alm et al. | |
| 2016/0284009 A1* | 9/2016 | Shah | G06Q 10/1095 |
| 2016/0293049 A1 | 10/2016 | Monahan et al. | |
| 2017/0072850 A1* | 3/2017 | Curtis | B60W 50/0097 |
| 2017/0102463 A1 | 4/2017 | Hwang | |
| 2017/0263120 A1* | 9/2017 | Durie, Jr. | G08G 1/205 |
| 2017/0366935 A1 | 12/2017 | Ahmadzadeh et al. | |
| 2018/0012462 A1* | 1/2018 | Heitz, III | G06V 40/20 |
| 2018/0025636 A1* | 1/2018 | Boykin | G08G 1/096725 701/1 |
| 2018/0063576 A1 | 3/2018 | Tillman et al. | |
| 2018/0068206 A1 | 3/2018 | Pollach et al. | |
| 2018/0071610 A1 | 3/2018 | Miller | |
| 2018/0072313 A1 | 3/2018 | Stenneth | |
| 2018/0126901 A1* | 5/2018 | Levkova | B60W 40/09 |
| 2018/0154870 A1 | 6/2018 | Kurata | |
| 2018/0178811 A1* | 6/2018 | Ohta | G06V 10/806 |
| 2018/0262724 A1 | 9/2018 | Ross | |
| 2018/0315340 A1* | 11/2018 | Chauncey | B60W 40/09 |
| 2018/0329381 A1 | 11/2018 | Doh et al. | |
| 2018/0338120 A1* | 11/2018 | Lemberger | G06V 20/41 |
| 2019/0007690 A1 | 1/2019 | Varadarajan et al. | |
| 2019/0026772 A1 | 1/2019 | Perakslis et al. | |
| 2019/0035091 A1 | 1/2019 | Bi et al. | |
| 2019/0065951 A1 | 2/2019 | Luo et al. | |
| 2019/0071091 A1 | 3/2019 | Zhu et al. | |
| 2019/0137622 A1* | 5/2019 | Lopez-Hinojosa | G01S 13/865 |
| 2019/0147263 A1 | 5/2019 | Kuehnle et al. | |
| 2019/0168777 A1* | 6/2019 | Lester | G08G 1/166 |
| 2019/0174158 A1 | 6/2019 | Herrick et al. | |
| 2019/0205785 A1 | 7/2019 | Volk et al. | |
| 2019/0244301 A1 | 8/2019 | Seth et al. | |
| 2019/0251658 A1 | 8/2019 | Lee et al. | |
| 2019/0257661 A1 | 8/2019 | Stentz et al. | |
| 2019/0303718 A1 | 10/2019 | Tanigawa et al. | |
| 2019/0382237 A1 | 12/2019 | Witczak et al. | |
| 2020/0018612 A1 | 1/2020 | Wolcott | |
| 2020/0026282 A1 | 1/2020 | Choe et al. | |
| 2020/0086852 A1* | 3/2020 | Krekel | B60W 50/14 |
| 2020/0162489 A1 | 5/2020 | Bar-nahum et al. | |
| 2020/0242367 A1 | 7/2020 | Ludwigsen et al. | |
| 2020/0327009 A1 | 10/2020 | Callison et al. | |
| 2020/0342235 A1 | 10/2020 | Tsai et al. | |
| 2020/0342274 A1 | 10/2020 | Elhattab et al. | |
| 2022/0165073 A1 | 5/2022 | Shikii et al. | |

OTHER PUBLICATIONS

U.S. Appl. No. 16/794,114, filed Feb. 18, 2020, Baseline Event Detection System.
"U.S. Appl. No. 16/395,927, Non Final Office Action mailed Nov. 24, 2020", 10 pgs.
"U.S. Appl. No. 16/395,927, Final Office Action mailed Oct. 16, 2019", 15 pgs.
"U.S. Appl. No. 16/395,927, Non Final Office Action mailed Jun. 11, 2019", 10 pgs.
"U.S. Appl. No. 16/395,927, Response filed Jan. 15, 2020 to Final Office Action mailed Oct. 16, 2019", 12 pgs.
"U.S. Appl. No. 16/395,927, Response filed Aug. 8, 2019 to Non Final Office Action mailed Jun. 11, 2019", 14 pgs.
"U.S. Appl. No. 16/395,927, Non Final Office Action mailed Mar. 5, 2020", 16 pgs.
"U.S. Appl. No. 16/395,927, Examiner Interview Summary mailed Apr. 13, 2020", 3 pgs.
"U.S. Appl. No. 16/395,927, Response filed Jun. 1, 2020 to Non Final Office Action mailed Mar. 5, 2020", 13 pgs.
"U.S. Appl. No. 16/395,927, Final Office Action mailed Aug. 28, 2020", 10 pgs.
"U.S. Appl. No. 16/395,927, Examiner Interview Summary mailed Oct. 8, 2020", 3 pgs.
"U.S. Appl. No. 16/395,927, Response filed Oct. 14, 2020 to Final Office Action mailed Aug. 28, 2020", 13 pgs.
"U.S. Appl. No. 16/395,927, Notice of Allowance mailed Apr. 7, 2021", 14 pgs.
"U.S. Appl. No. 16/395,927, Response filed Mar. 18, 2021 to Non Final Office Action mailed Nov. 24, 2020", 12 pgs.
"U.S. Appl. No. 16/794,114, Final Office Action mailed Feb. 11, 2022", 13 pgs.
"U.S. Appl. No. 17/304,810, Preliminary Amendment filed Sep. 9, 2021", 7 pages.
"U.S. Appl. No. 16/794,114, Non Final Office Action mailed Sep. 22, 2021", 10 pgs.
"U.S. Appl. No. 16/794,114, Response filed Oct. 29, 2021 to Non Final Office Action mailed Sep. 22, 2021", 10 pgs.
"U.S. Appl. No. 16/794,114, Non Final Office Action mailed May 24, 2022", 12 pgs.
"U.S. Appl. No. 16/794,114, Response filed Apr. 29, 2022 to Final Office Action mailed Feb. 11, 2022", 10 pgs.
"U.S. Appl. No. 16/794,114 Response filed Aug. 9, 2022 to Non-Final Office Action filed May 24, 2022", 16 pgs.
"U.S. Appl. No. 17/304,810, Non Final Office Action mailed Sep. 23, 2022", 9 pgs.
"U.S. Appl. No. 16/794,114, Final Office Action mailed Nov. 4, 2022", 13 pgs.
"U.S. Appl. No. 17/304,810, Response filed Nov. 10, 2022 to Non Final Office Action mailed Sep. 23, 2022", 10 pgs.

(56) References Cited

OTHER PUBLICATIONS

"U.S. Appl. No. 16/794,114, Response filed Nov. 22, 2022 to Final Office Action mailed Nov. 4, 2022", 10 pgs.
"U.S. Appl. No. 17/304,810, Final Office Action mailed Nov. 23, 2022", 11 pgs.
"U.S. Appl. No. 16/794,114, Non Final Office Action mailed Feb. 16, 2023", 13 pgs.
"U.S. Appl. No. 17/304,810, Response filed Feb. 23, 2023 to Final Office Action mailed Nov. 23, 2022", 10 pgs.
"U.S. Appl. No. 16/794,114, Response filed May 2, 2023 to Non Final Office Action mailed Feb. 16, 2023", 10 pgs.
"U.S. Appl. No. 17/304,810, Non Final Office Action mailed May 8, 2023", 11 pgs.
"U.S. Appl. No. 17/304,810, Response filed May 26, 2023 to Non Final Office Action mailed May 8, 2023", 9 pgs.
"U.S. Appl. No. 16/794,114, Notice of Allowance mailed Jun. 7, 2023", 10 pgs.
"U.S. Appl. No. 17/304,810, Notice of Allowance mailed Aug. 9, 2023", 9 pgs.

\* cited by examiner

400

```
┌─────────────────────────────────────────────────────────────┐
│  DETECTING A FEATURE WITHIN A FRAME OF A VIDEO STREAM OF THE│
│  SENSOR DATA, THE FEATURE ASSOCIATED WITH THE EVENT TYPE OF │
│                       THE EVENT                             │
│                          402                                │
└─────────────────────────────────────────────────────────────┘
                              │
                              ▼
┌─────────────────────────────────────────────────────────────┐
│  IDENTIFYING A PRECURSOR TO THE EVENT BASED ON THE FEATURE  │
│         WITHIN THE FRAME OF THE VIDEO STREAM                │
│                          404                                │
└─────────────────────────────────────────────────────────────┘
                              │
                              ▼
┌─────────────────────────────────────────────────────────────┐
│  ACCESSING INERTIAL DATA FROM AN ACCELEROMETER STREAM OF THE│
│  SENSOR DATA IN RESPONSE TO THE DETECTING THE PRECURSOR TO  │
│                       THE EVENT                             │
│                          406                                │
└─────────────────────────────────────────────────────────────┘
                              │
                              ▼
┌─────────────────────────────────────────────────────────────┐
│      DETECTING THE EVENT BASED ON THE INERTIAL DATA         │
│                          408                                │
└─────────────────────────────────────────────────────────────┘
```

*FIG. 4*

EVENT NOTIFICATION SYSTEM

CLAIM OF PRIORITY

This application is a continuation-in-part application of and claims priority benefit from U.S. patent application Ser. No. 16/395,927, filed on Apr. 26, 2019 and entitled "OBJECT-MODEL BASED EVENT DETECTION SYSTEM," and which is hereby incorporated by reference herein in its entirety.

TECHNICAL FIELD

Embodiments of the present disclosure relate generally the field of communication technology and, more particularly, but not by way of limitation, to an architecture for systems and methods for detecting events based on sensor data collected at one or more sensor devices, and presenting notifications based on the detected events.

BACKGROUND

A dashcam, or event data recorder (EDR), is an onboard camera that continuously records the view through a vehicle's front windscreen and sometimes the interior of the vehicle. Some EDRs also record acceleration, deceleration, speed, steering angle, global positioning system (GPS) data, and throttle position information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of accessing sensor data from a plurality of sensor devices responsive to detecting an event, according to certain example embodiments

DETAILED DESCRIPTION

Figure 1:
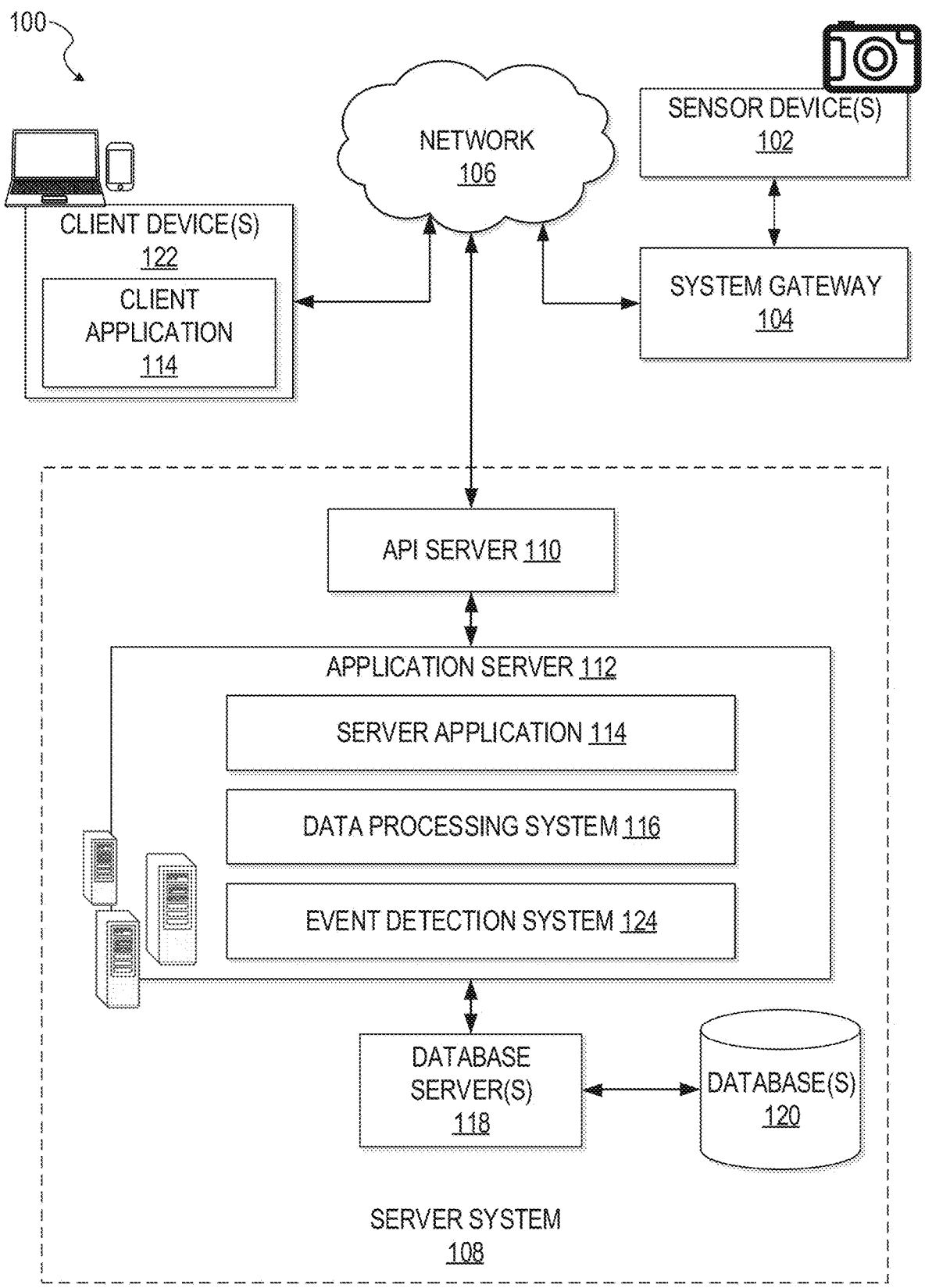
FIG. 1 is a block diagram showing an example system for exchanging data (e.g., sensor data and associated content) over a network in accordance with some embodiments, wherein the system includes an event detection system.

As discussed above, EDRs may include devices with an integrated onboard camera that continuously record data that include video, as well as acceleration, deceleration, speed, steering angle, global positioning system (GPS) data, and throttle position information. EDRs therefore generate data which can be used to review activities performed by a fleet of vehicles and can be used to formulate bases for improvements in safety in a variety of areas.

While these systems are effective in recording data related to events, the existing systems lack functionality to efficiently detect and monitor events, and precursors to events, in real-time, let alone to provide interfaces to enable users to manage and view recorded data. A system which detects events and provides real-time data monitoring and alerting is therefore described below.

Example embodiments described herein relate to an event detection system that comprises a plurality of sensor devices to perform operations that include: generating sensor data at the plurality of sensor devices; accessing the sensor data generated by the plurality of sensor devices; detecting an event, or precursor to an event, based on the sensor data, wherein the detected event corresponds to an event category; accessing an object model associated with the event type in response to detecting the event, wherein the object model defines a procedure to be applied by the event detection system to the sensor data; and streaming at least a portion of a plurality of data streams generated by the plurality of sensor devices to a server system based on the procedure, wherein the server system may perform further analysis or visualization based on the portion of the plurality of data streams.

The plurality of sensors may include a front facing camera, and a cabin facing camera (e.g., a dashcam), as well as an accelerometer, a gyroscope, one or more microphones, a temperature sensor, GPS sensors, as well as an interface to couple the event detection system with a vehicle electronic control unit (ECU), and all configured to generate a plurality of data streams that may be used to detect events or precursors to events. The plurality of sensors may in some embodiments be integrated into a single package, while in further embodiments, one or more of the sensors may be mounted at remote positions from one another based on use and need. The plurality of sensors may further be coupled with a network gateway (hereinafter "gateway"). The gateway facilitates sharing sensor data generated by the plurality of sensor devices from one discrete network to another, and in some embodiments may perform additional processing for the event detection system.

As discussed herein, an "event" may comprise a combination of conditions detected by the sensor devices. An administrator of the event detection system may provide event definitions, wherein each event definition includes one or more of: an event type or identifier (e.g., roll-over, crash, speeding, rolling stop, distracted driver); a set of thresholds; and a set of conditions represented by a set of sensor data from one or more sensor devices from among the plurality of sensor devices of the event detection system. For example, a "rolling stop" may be defined by a set of conditions that include: the presence of a stop sign in one or more frames of a video stream; inertial data indicating that a stop did not occur; and GPS data indicating that a vehicle did not stop at a location associated with the stop sign. Similarly, a "precursor" to the event may be defined by a portion of an event definition. For example, in the example of the "rolling stop" described above, a precursor to the event may be defined as the detection of the stop sign in one or more frames of the video stream.

In some embodiments, each event type or identifier of an event definition may be associated with corresponding object models. An object model of a particular event or precursor to an event includes the event definitions of the event and precursors to the events and defines procedures or subroutines to be performed by the event detection system in response to detecting an event or precursor to an event. For example, the procedures of an object model may define a data-flow of sensor data through one or more processing components of the event detection system, processing operations to be performed upon the sensor data at the one or more processing components of the event detection system, visualization and display instructions for the sensor data, as well as a bit rate (hereinafter "data rate") to generate and access the sensor data responsive to detecting an event or precursor to an event.

The detection of events and precursors to events may be performed by one or more processors associated with the plurality of sensor devices, one or more processors associated with the gateway, or by one or more processors associated with the server system, or any combination thereof.

According to certain example embodiments, the detection of events based on the sensor data may include: detecting events based on a comparison of sensor data to one or more thresholds defined by the event definitions; detecting events by detecting features within the sensor; and detecting events based on an output of a neural network (i.e., a time delayed neural network) trained to recognize features corresponding to certain events and precursors to events.

Accordingly, in some example embodiments, detection of an event by the plurality of sensors may be based upon video data generated by one or more cameras of the event detection system. For example, a neural network or machine learned model may be trained to recognize features or signals corresponding to certain types of objects that correspond with an event definition (e.g., signage, a stop sign, yield, children crossing, rail-road, etc.). In some embodiments, the signals detected may also include gestures performed by an occupant of a vehicle (e.g., a peace sign). Responsive to recognizing the features that correspond to the object associated with the event definition, the event detection system may access an object model associated with the corresponding event definition. An object model defines procedures and subroutines to be performed by the event detection system.

Similarly, detection of an event by the plurality of sensors may be based upon a stereoscopic inference model generated by the event detection system based on sensor data from one or more of the sensor devices. For example, the plurality of sensors may include a dashcam, and the sensor data may include video data that comprises monocular image data. The event detection system may generate a depth model based on the monocular image data through a stereoscopic inference model trained to construct a 3-dimensional (3D) depth model based on monocular image data. The event detection system may compare the depth model against one or more threshold values to detect events.

In further embodiments, the method of detecting an event may vary based upon the type of sensor data accessed and analyzed. In some embodiments the sensor data may include inertial data, audio data, or location data. Detecting of an event may therefore include detecting one or more values of the sensor data transgressing threshold values corresponding to event types. For example, an event may be triggered based on an inertial value transgressing a threshold value, or in further embodiments, an event may be triggered based on the location data generated by a sensor device transgressing a boundary or reaching a destination.

The object models associated with events may further define presentation and display instructions for sensor data of the events. The presentation and display instructions may include an identification of one or more client devices to present a notification responsive to the detection of an event, as well as display instructions to visualize and display sensor data corresponding to events. For example, the notification may include a display of an identifier, such as a user identifier, or an identifier associated with a sensor device, as well as one or more event attributes of the detected event.

According to certain example embodiments, the event detection system performs operations that include presenting notifications and alerts responsive to detecting an event, or a pre-cursor to an event. For example, the event detection system may perform operations that include: detecting an event based on at least a portion of the sensor data, the event comprising a plurality of event attributes; determining one or more event attributes from the plurality of event attributes of the event transgress a threshold value; and causing display of a notification that includes a presentation of at least the portion of the sensor data in response to the determining that the one or more event attributes from among the plurality of event attributes of the event transgress the threshold value.

In some embodiments, as discussed above, the sensor device may include a dashcam that generates a data stream comprising image data (i.e., a real-time video), as well an accelerometer, a GPS system, and a gyroscope that generate data indicative of movement. The event detection system may detect events based on portions of the image data of the data stream. The events may include but are not necessarily limited to "distracted driving," a "forward collision warning," and a "lane departure." For example, a "forward collision warning" may be triggered based on image data from the sensor device indicating that a vehicle associated with the sensor device came within a threshold distance of another vehicle, or object, which may be depicted in the data stream generated by the sensor device. Similarly, an event may also include a "lane-departure" in which a vehicle associated with the sensor device crosses over road markings indicative of a lane, or in instances where road marking aren't present, wherein the vehicle associated with the sensor device swerves or abruptly changes trajectory in the absence of an obstacle.

Responsive to detecting an event based on a portion of the sensor data from the data stream generated by the sensor device, the event detection system determines attributes of the event (e.g., a time-to-collision), identifies a user account associated with the sensor device, and presents an alert or notification. For example, the alert or notification may include operations to causes display of a notification that includes an identifier associated with the user account and the event at a client device. For example, the event detections system may identify the client device to present the notification based on attributes of the event, as well as an identifier associated with the sensor device. In further embodiments, the alert may include a haptic alert presented within the vehicle. The client device may be communicatively coupled with one or more alerting devices, that may include provide a haptic alert to an occupant of the vehicle through a seat or steering wheel.

For example, in some embodiments, the determination of a recipient of the notification, and a type of notification to be displayed may be based on a comparison of one or more event attributes of the event to one or more threshold values. As an illustrative example, notifications for some events may be presented at a first client device as a push-notification, whereas notifications for other events may be presented at a second client device, or just recorded at a memory location of a repository.

In some embodiments, the notification may include a display of a portion of the sensor data from the data stream. For example, the sensor data may include a video comprising a sequence of images, wherein the event may be detected by the event detection system based on a portion of the video (i.e., 30 seconds). Responsive to detection of the event, the event detection system may generate a presentation of the portion of the sensor data, and cause display of a notification that includes the presentation of the portion of the sensor device.

In some embodiments, the event detection system may detect events based on baseline data generated based on a portion of the sensor data from the data stream. For example, the event detection system may access sensor data from one or more sensor devices and generate baseline data based on a portion of the sensor data from the one or more sensor devices. The baseline data may comprise sensor data from a predefined period of time that may for example begin from the start of the trip (e.g., 5 minutes after vehicle begins moving, or ignition is keyed on), or based on sensor data collected at a predetermined portion of the trip (e.g., first 50 miles). In some embodiments, the portion of the sensor data may be identified based on location information. For example, the baseline data may be based on the portion of the sensor data collected within a geographic area, based on location data associated with the sensor data. In further embodiments, the baseline data may be generated based on explicit user inputs that select portions of the sensor data. Accordingly, the event detection system may perform a comparison of sensor data generated by the one or more sensor devices against the baseline data in order to detect events. In some embodiments, the event detection system may generate a machine learned model based on the baseline data.

A "distracted-driving" event may be detected based on sensor data that includes gaze tracking data and head pose data. In such embodiments, the gaze tracking data and head pose data may be generated based on a driver-facing dashcam configured to capture image data depicting the driver of a vehicle. In such embodiments, responsive to the detection of the start of a trip, the event detection system may generate the baseline data set based on the gaze tracking data and head pose data collected during a predetermined period defined as a period of time or distance traveled.

A "forward collision warning" may be triggered based on sensor data that includes image data collected by a sensor device that includes a dashcam, as well as accelerometer data. For example, the dashcam may be configured to continuously collect image data depicting an external view of a vehicle, such as through the vehicle's front windshield. According in such embodiments, the event detection system may perform computer vision and collision detection techniques to identify and detect an impending collision with an object, and attributes of the impending collision that include a time-to-collision.

Similarly, a "lane-departure" event may be detected based on sensor data that include some or all of image data, laser sensor data, and infrared data collected by a sensor device that includes a dashcam, as well as accelerometer data. For example, in some embodiments, the event detection system may employ the principles of a Hough transform and a Canny edge detector to detect lane lines based on the sensor data. In such embodiments, a "lane departure" event may include detecting the vehicle crossing over a lane.

FIG. 1 is a block diagram showing an example system 100 for detecting events based on sensor data. The system 100 includes one or more client device(s) 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor device(s) 102, and the system gateway 104. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an event detection system 124. The event detection system 124 is configured to access sensor data generated by the one or more sensor devices 102, detect events or precursors to events based on the sensor data, and access an object model that corresponds with the events or precursors to events, wherein the object model defines a data-flow, according to some example embodiments. Further details of the event detection system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
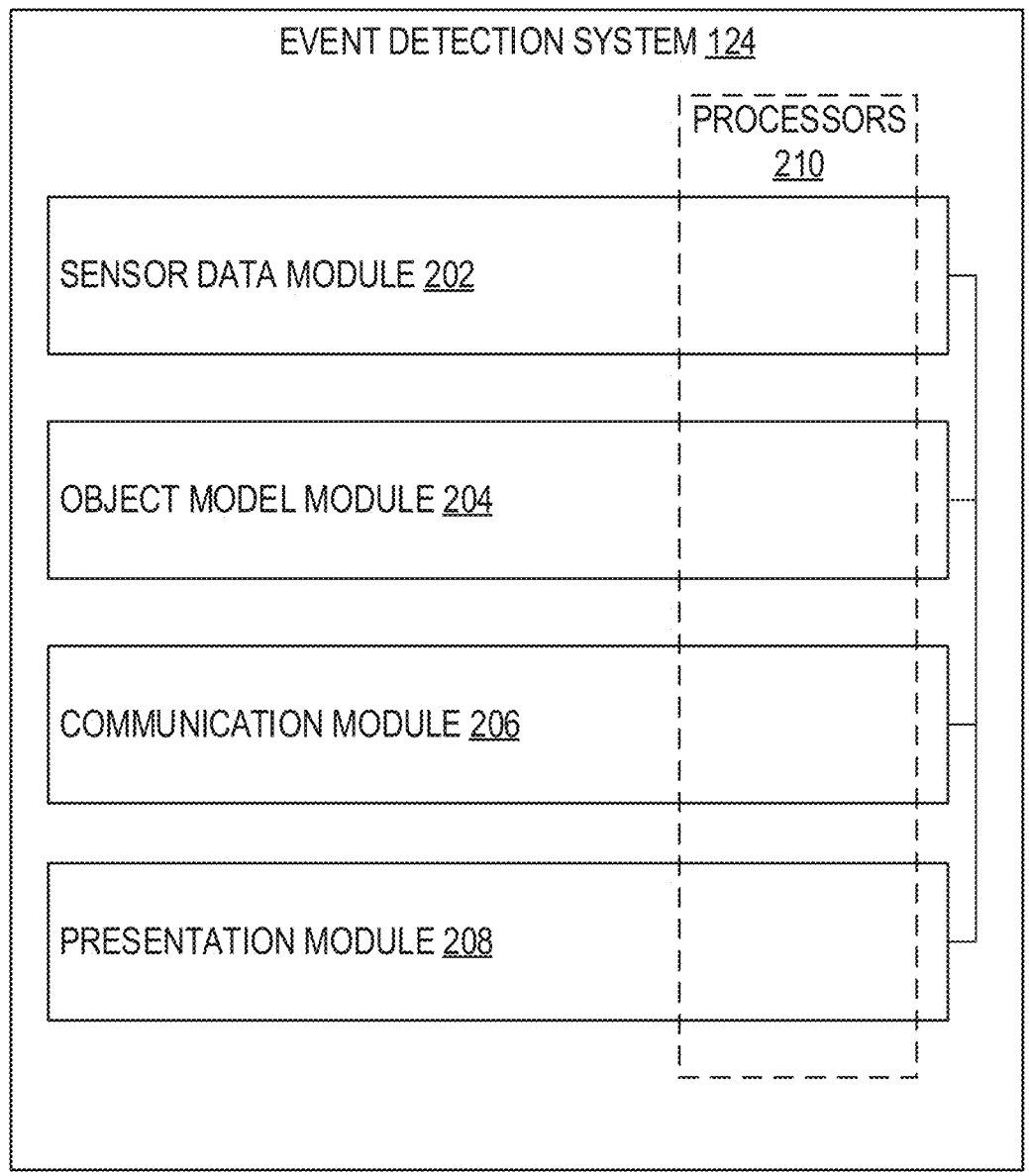
FIG. 2 is a block diagram illustrating various modules of an event detection system, according to certain example embodiments.

FIG. 2 is a block diagram illustrating components of the event detection system 124 that configure the event detection system 124 to perform operations to access sensor data generated by a plurality of sensor devices, detect events or precursors to events based on the sensor data, and to access an object model that corresponds to the event or precursor to the event detected based on the sensor data, according to some example embodiments.

The event detection system 124 is shown as including a sensor data module 202, an object model module 204, a communication module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the event detection system 124 may physically include an arrangement of one or more of the processors 210 (e.g., a subset of or among the one or more processors of the machine) configured to perform the operations described herein for that module. As another example, any module of the event detection system 124 may include software, hardware, or both, that configure an arrangement of one or more processors 210 (e.g., among the one or more processors of the machine) to perform the operations described herein for that module. Accordingly, different modules of the event detection system 124 may include and configure different arrangements of such processors 210 or a single arrangement of such processors 210 at different points in time. Moreover, any two or more modules of the event detection system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

As discussed above, according to certain example embodiments, the event detection system 124 may maintain one or more object models that correspond with a plurality of event definitions, where an object model includes the conditions associated with an event definition and comprises a set of procedures and subroutines to be performed by the event detection system 124 responsive to the detection of an event or precursor to an event. In some embodiments, a portion of the object models and event definition may be stored within the databases 120, at the server system 108, while in further embodiments, a portion of the object models and event definitions may be stored at a local memory of the sensor devices 102, the gateway 104, as well as the client device 122.

Figure 3:
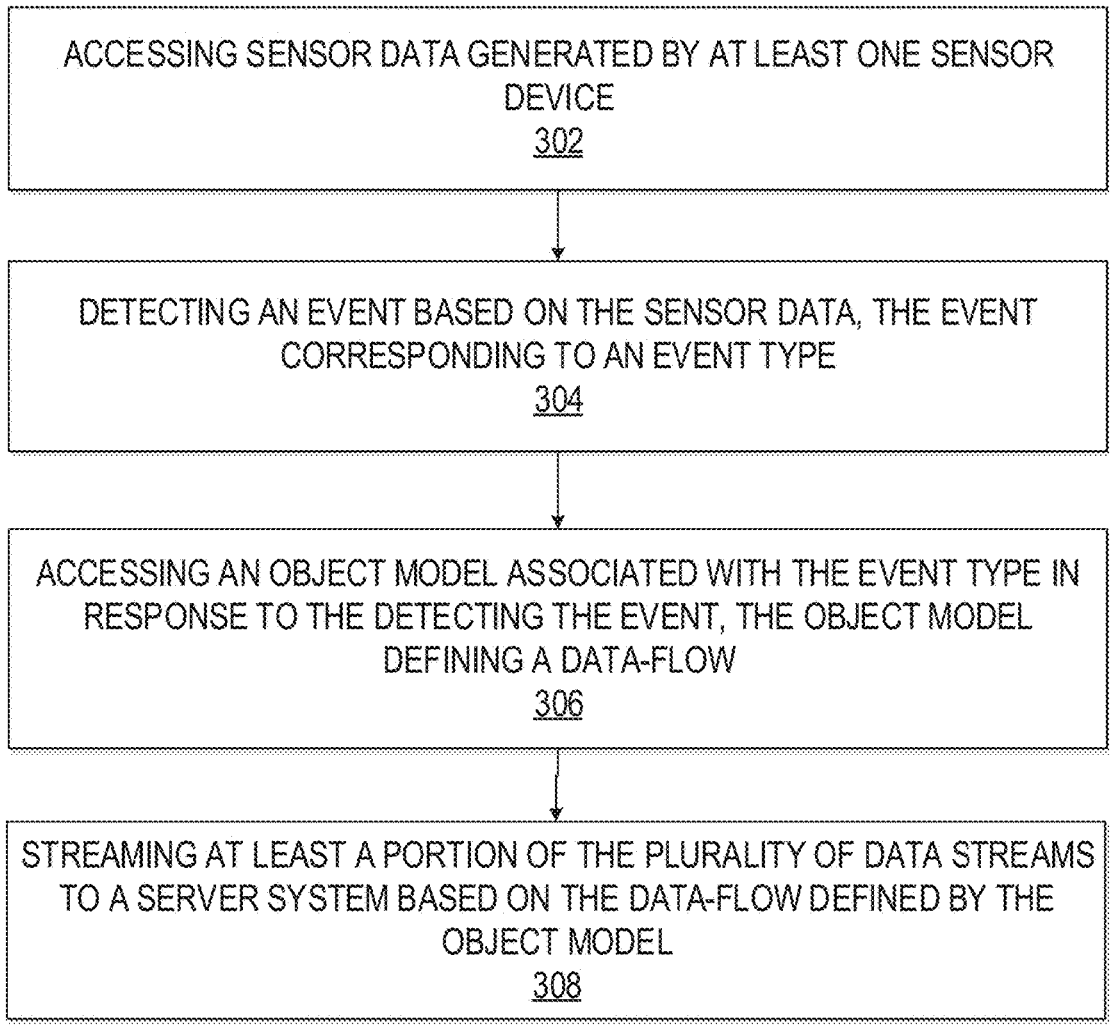
FIG. 3 is a flowchart depicting a method of detecting an event based on sensor data from a plurality of sensor devices and an object model, according to certain example embodiments.

FIG. 3 is a flowchart depicting a method 300 of detecting an event based on sensor data from a plurality of sensor devices 102, and an object model, according to certain example embodiments. Operations of the method 300 may be performed by the modules described above with respect to FIG. 2. As shown in FIG. 3, the method 300 includes one or more operations 302, 304, 306, and 308.

At operation 302, sensor data generated by at least one sensor device is accessed at a first network node. For example, the sensor data module 202 accesses sensor data generated by at least one sensor device from among the sensor device(s) 102 at a baseline data rate. The sensor device may include a camera, such as a dashcam, and the sensor data may comprise a video stream.

The sensor data module 202 detects an event or precursor to an event based on the sensor data, wherein the event or precursor to the event corresponds to an event definition. The event or precursor to the event detected by the sensor data module 202 can for example include a feature of a video frame from video data collected from a dashcam (e.g., a sensor device 102). The feature may correspond to an object depicted within the video.

According to certain embodiments, the sensor data module 202 may include a machine learned model or neural network trained to recognize features corresponding to certain types of objects (e.g., signage, a stop sign, yield, children crossing, rail-road, etc.), and to receive sensor data, and output a result that includes an identification of an object. As an illustrative example, the sensor device 102 may include a dashcam, and the sensor data may comprise video data generated by the dashcam and collected by the sensor data module 202 at a first data rate, and the neural network may be trained with labeled feature data to identify one or more events based on the labeled feature data.

At operation 306, in response to the sensor data module 202 detecting the event or precursor to the event based on the sensor data, the object model module 204 accesses an object model that corresponds with the event or precursor to the event detected based on the sensor data. The object model provides event definitions associated with the precursor to the event detected by the sensor data module 202 and provides a procedure to be performed by the event detection system 124 that includes a data flow of sensor data from the sensor devices 102, and a set of conditions or criteria associated with the detected event or precursor to the event, such as threshold values.

At operation 308, based on the procedure defined by the object model, a second network node accesses sensor data from the portion of the sensor devices. For example, the communication module 206 causes the gateway 104 to access sensor data from a portion of the sensor devices 102 based on the procedure defined by the object model. In some embodiments, at operation 308, the communication module 206 may additionally cause the gateway 104 to stream the sensor data from the portion of the sensor devices to the server system 108 for further analysis.

In certain example embodiments, the object model associated with a precursor to an event may identify one or more sensor devices to activate or access responsive to the precursor to the event. For example, in some embodiments, the event detection system 124 may be configured to access and record sensor data from a "primary" sensor device (e.g., a dashcam), and in response to detecting a precursor to an event, accessing one or more secondary sensor devices to retrieve sensor data.

FIG. 4 is a flowchart depicting a method 400 of accessing sensor data from a plurality of sensor devices 102 responsive to detecting an event, according to certain example embodiments. Operations of the method 400 may be performed by the modules described above with respect to FIG. 2. As shown in FIG. 4, the method 400 includes one or more operations 402, 404, 406, and 408. In some embodiments, the operations of the method 400 may be performed as a precursor to, or subroutine of, one or more of the operations of the method 300 depicted in FIG. 3, such as operation 302.

According to certain example embodiments, the sensor devices 102 may include one or more cameras, such as dashcams, wherein the dashcams may be directed inside a vehicle, to capture images and videos depicted occupants of the vehicle, as well as directed in front of and in some cases behind the vehicle.

At operation 402, the sensor data module 202 detects a feature within a frame of a video stream from one or more of the sensor devices 102. In some embodiments, the sensor data module 202 may include a neural network or machine learned model trained to recognize certain features that correspond to events and precursors to events. For example, the features may depict objects such as signs (e.g., a stop sign) as well as facial features and expressions of a driver of a vehicle.

At operation 404, in response to detecting a feature within the frame of the video stream from one or more of the sensor devices 102, the sensor data module 202 determines that the feature corresponds to a precursor to an event. For example, the feature may include a gaze direction of a driver of the vehicle, or a sign depicted within a frame of the video stream.

In some embodiments, the precursor to the event may correspond with an object model that defines conditions and thresholds associated with an event. For example, an event may include running a stop-sign or red light, while the precursor to the event is the detection of a sign or stop light within an image frame of the video stream generated by one or more of the sensor devices 102. Responsive to the sensor data module 202 detecting the precursor to the event, the object model module 204 accesses an object model that includes an event definition comprising a set of conditions and thresholds, and provides procedures and subroutines to be performed by one or more modules of the event detection system 124 in response to detecting the precursor to the event.

At operation 406, the sensor data module 202 accesses a portion of the sensor data generated by the sensor devices 102 based on the object model associated with the precursor to the event. For example, the portion of the sensor data identified by the object model based on the definition of the event associated with the precursor may include inertial data, GPS data, as well as vehicle ECU data. At operation 408, the sensor data module 202 detects the event based on the portion of the sensor data generated by the sensor devices 102. In some embodiments, the operations of the method 400 may be performed by one or more processors of the sensor devices 102 themselves, or by one or more processors associated with the gateway 104, or any combination thereof.

In certain example embodiments, the event detection system 124 may be configured to access and stream sensor data from the sensor devices 102 at a "baseline" data rate. For example, under normal operating conditions, in the absence of one or more event conditions, the event detection system 124 may be configured to cause the sensor devices 102 to generate sensor data at a reduced resolution, and to cause the gateway 104 to stream segments of sensor data to the server system 108 at predefined intervals based on the baseline data rate.

Accordingly, in some embodiments, the procedures defined by the object models may include instructions to cause one or more processors associated with the sensor devices 102, the gateway 104, and the client device 122 to increase the data rate and resolution in which sensor data is generated and accessed by the event detection system 124, responsive to detecting an event or precursor to an event.

Figure 5:
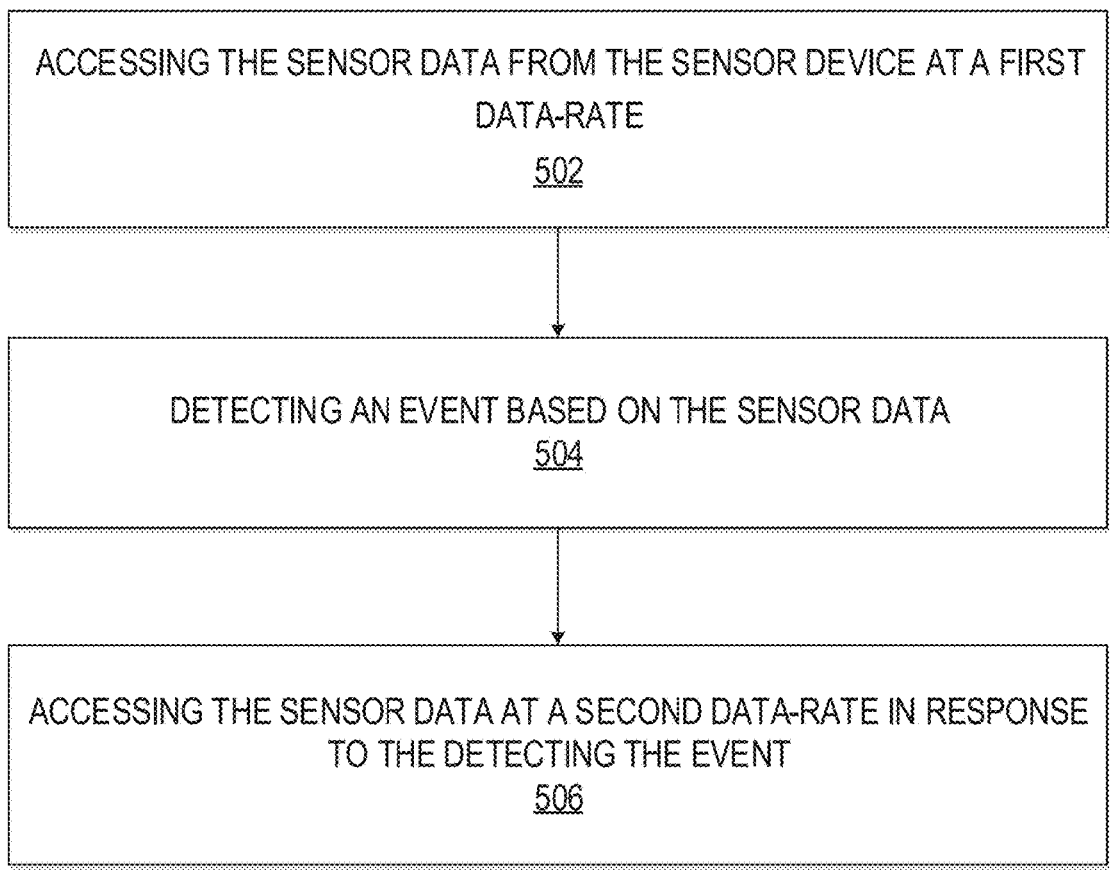
FIG. 5 is a flowchart depicting a method of detecting an event, according to certain example embodiments.

FIG. 5 is a flowchart depicting a method 500 of detecting an event based on sensor data generated by a plurality of sensor devices 102, according to certain example embodiments. Operations of the method 500 may be performed by the modules described above with respect to FIG. 2. As shown in FIG. 5, the method 500 includes one or more operations 502, 504, and 506. The method 500 may be performed as a precursor to, or subroutine of, one or more of the operations of the methods 300 and 400, as depicted in FIGS. 3 and 4.

At operation 502, the sensor data module 202 accesses sensor data from the plurality of sensor devices 102 at a first data rate. For example, the event detection system 124 may be configured to access and stream data from the plurality of sensor devices 102 at a baseline data rate.

In some embodiments, the event detection system 124 may be configured to cause the gateway 104 to stream snapshots of sensor data from the sensor devices 102 at a predefined interval or data rate. For example, at the baseline rate, the event detection system 124 may only stream a portion of the sensor data from the sensor devices 102 through the gateway 104 to the server system 108.

At operation 504, the sensor data module 202 detects an event, or a precursor to an event, based on the sensor data, as discussed in the methods 300 and 400 of FIGS. 3 and 4. In response to detecting the event or precursor to the event, at operation 506, the event detection system 124 may cause the sensor data module 202 to access the sensor data from the sensor devices 102 at a second data rate. In some embodiments, the second data rate may be based on an event type of the event or precursor to the event detected by the sensor data module 202.

In some embodiments, operation 506 may also include causing the sensor data module 202 to stream a sensor data from a specific set of sensor devices from among the sensor devices 102. For example, in response to detecting an event based on sensor data from a first sensor device, the sensor data module 202 may access and stream sensor data from the first sensor device, and a second and third sensor device from among a plurality of sensor devices.

Figure 6:
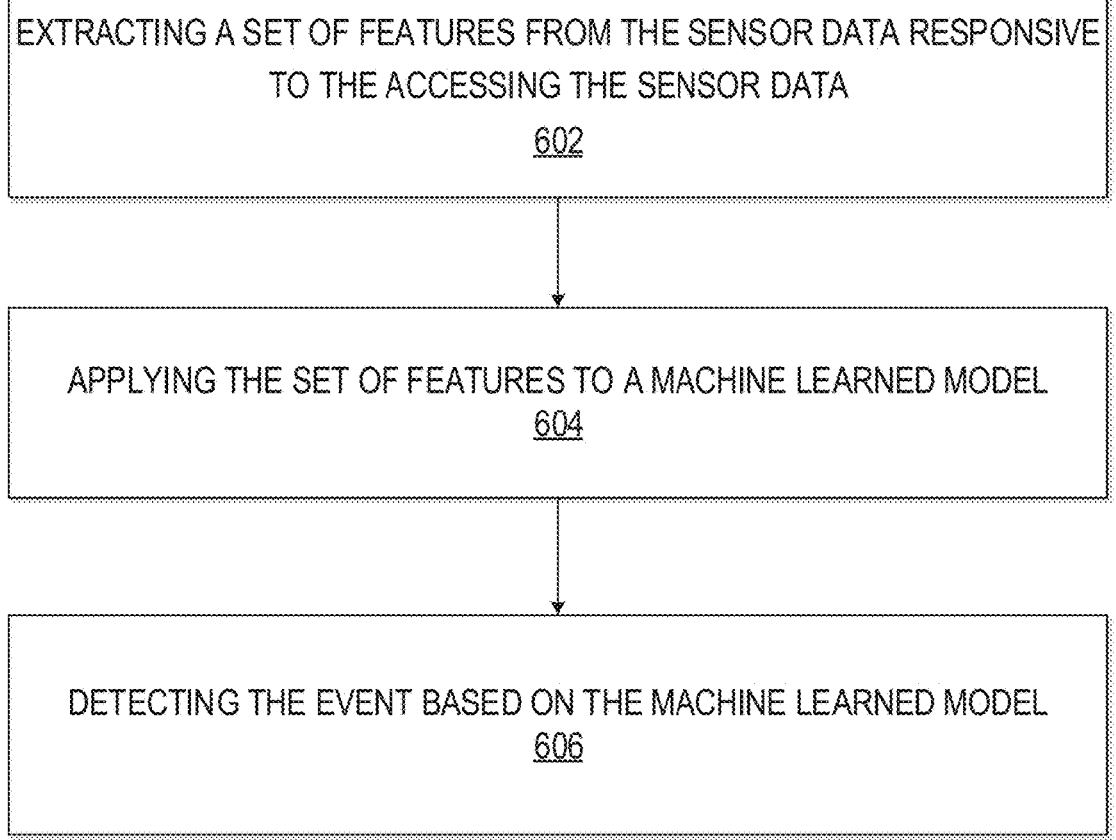
FIG. 6 is a flowchart depicting a method of detecting an event, according to certain example embodiments.

FIG. 6 is a flowchart depicting a method 600 of detecting an event based on sensor data generated by a plurality of sensor devices 102, according to certain example embodiments. Operations of the method 600 may be performed by the modules described above with respect to FIG. 2. As shown in FIG. 6, the method 600 includes one or more operations 602, 604, and 606. The method 600 may be performed as a precursor to, or subroutine of, one or more of the operations of the methods 300, 400, and 500, as depicted in FIGS. 3, 4, and 5.

At operation 602, upon accessing the sensor data from the sensor devices 102, as in operation 302 of the method 300, and operation 502 of the method 500, the sensor data module 202 extracts a set of features from the sensor data. For example, the sensor data may include video data generated by a dashcam, wherein the dashcam is configured to capture images of occupants of a vehicle. The set of features extracted from the sensor data may therefore include facial landmarks and image features depicting the occupants of the vehicle.

In response to extracting the set of features from the sensor data generated by the sensor devices 102, at operation 604 the sensor data module 202 applies the set of features to a machine learning model trained to identify events and precursors to events based on features. For example, the machine learning model may be trained to identify a distracted driver based on gaze tracking features. At operation 606, the sensor data module 202 identifies an event or precursor to an event based on the machine learned model.

Figure 7:
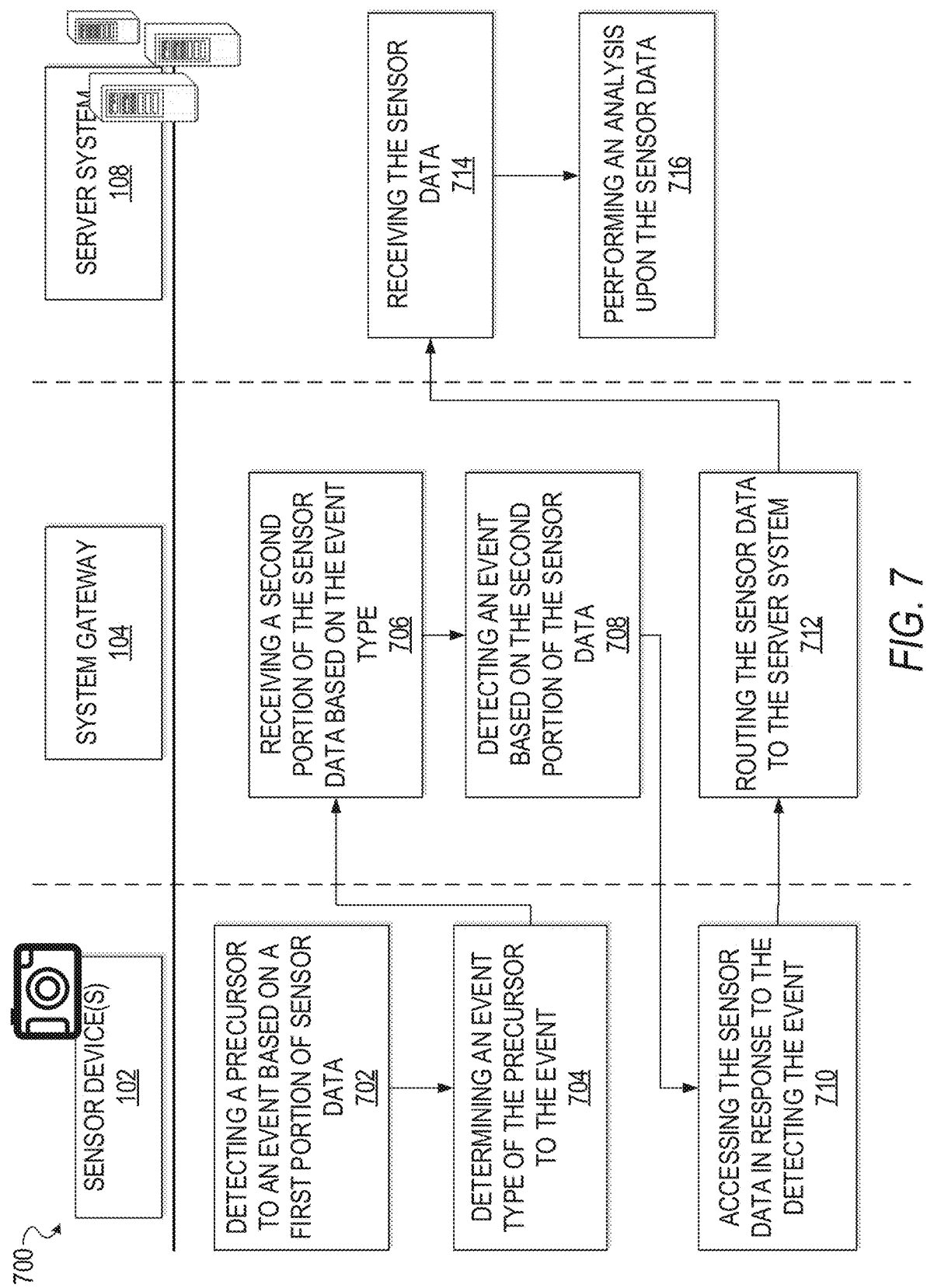
FIG. 7 is an interaction diagram depicting a flow of data, according to certain example embodiments.

FIG. 7 is an interaction diagram 700 depicting a flow of sensor data generated by the sensor devices 102, according to certain example embodiments. Operations of the interaction diagram 700 may be performed by the modules described above with respect to FIG. 2.

At operation 702, the sensor devices 102 detects a precursor to an event based on a first portion of sensor data generated by the sensor devices 102. For example, the first portion of the sensor data may include video data generated by a dashcam, and the precursor to the event may include a feature within the sensor data. For example, sensor devices 102 may include a neural network trained to identify objects correlated with precursors to events.

At operation 704, based on detecting the precursor to the event, the sensor devices 102 determines an event type that corresponds with the precursor to the event. The event type identifies an object model that defines a data flow of the sensor data.

At operation 706, the sensor devices 102 streams a second portion of the sensor data to the system gateway 104, where the second portion of the sensor data is based on the object model associated with the event type. At operation 708, the system gateway 104 detects an event based on the precursor to the event detected by the sensor device 102 and the second portion of the sensor data streamed by the sensor devices 102 to the system gateway 104.

At operation 710, based on the system gateway 104 detecting the event based on the second portion of the sensor data, the sensor devices 102 multiplex the sensor data from the plurality of sensors 102 and stream the multiplexed sensor data to the server system 108. At operation 712, the system gateway 104 routes the sensor data from the plurality of sensors 102 to the server system 108. At operation 714, the server system 108 receives the multiplexed sensor data.

In some embodiments, a portion of the plurality of sensors 102 may be integrated into the system gateway 104. For example, the system gateway 104 may include one or more sensor devices configured to generate sensor data. In further embodiments, the system gateway 104 may access the plurality of sensors 102 responsive to detecting an event based on a portion (e.g., the second portion) of the sensor data, as depicted in operation 708.

At operation 716, based on receiving the multiplexed sensor data, the server system 108 performs further analysis upon the sensor data, and in some embodiments may perform operations that include presenting a notification at a client device and causing display of a graphical user interface that comprises a presentation of visualizations based on the sensor data generated by the sensor devices 102.

For example, in some embodiments, the object model corresponding to the event may identify one or more client devices to be notified when an event is triggered and may also define notification features of the notifications to be presented. Responsive to detecting an event, the event detection system 124 presents the notification at the one or more client devices identified within the corresponding object model, wherein the notification includes a set of event attributes as defined based on the notification features from the object model.

Figure 8:
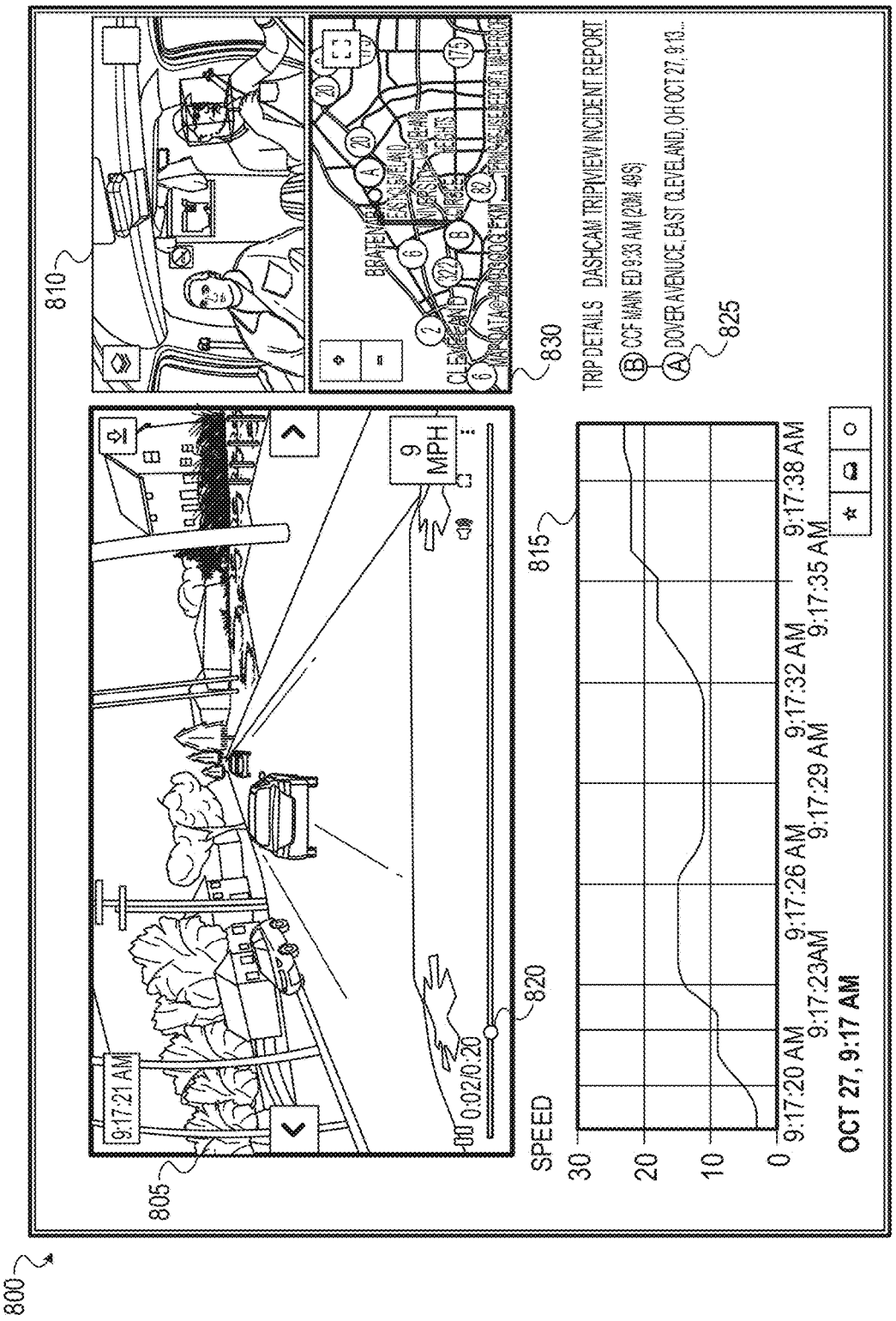
FIG. 8 is an interface diagram depicting a graphical user interface to present sensor data from one or more sensor devices, according to certain example embodiments.

FIG. 8 is an interface diagram depicting a GUI 800 to present sensor data from one or more sensor devices 102, according to certain example embodiments. As seen in the GUI 800, the presentation of the sensor data may include a video stream 805, depicting video data generated by a dashcam, a video stream 810, depicting video data generated by a driver facing dashcam, as well as a graph element 815, depicting sensor data captured by a vehicle ECU, and GPS data plotted over a period of time. In certain embodiments, the sensor data may also include an audio stream that comprises audio data collected by one or more sensor devices (i.e., microphones) in communication with the event detection system 124. For example, the audio data may be collected from a mobile device or device with similar audio recording capability, wherein the device may be coupled with one or more of the client device 122, the system gateway 104, the sensor devices 102, or the event detection system 124. Coupling may include wired as well as wireless connections. Accordingly, in such embodiments, a presentation of the audio data may be displayed at a position within the GUI 800, wherein the presentation of the audio data may include a visualization of the audio data, such as a display of a waveform, or an audio spectrum indicator.

In some embodiments, the period of time depicted by the graph element 815 may be based on temporal attributes of the video data depicted in the video streams 805 and 810. For example, the video stream 805 may include a display of a scrub bar, wherein a position of an indicator 820 on the scrub bar indicates a point in time of the video stream.

In some embodiments, the sensor data depicted in the graph element 815 may be scaled based on a length of the video data depicted in the video stream 805. For example, the position of the indicator 820 corresponds with a video frame of the video stream 805. As seen in the GUI 800, the position of the indicator 820 aligns vertically with corresponding sensor data in the graph element 815.

Similarly, the video stream 810 may be presented based on the video stream 805. For example, a user may provide an input moving the indicator 820 to a position that corresponds with a timestamped video frame of the video stream 805 along the scrub bar of the video stream 805. Based on receiving the input, the event detection system 124 updates the video stream 810 in the GUI 800 based on the position of the indicator 820 on the sub bar.

In some embodiments, the GUI 800 may include a display of an event log that includes a display of events detected by the event detection system 124, such as the event indicator 825. For example, based on detecting an event, as discussed in the methods 300 and 400 of FIGS. 3 and 4, the event detection system 124 may update the event log to include the event indicator 825, wherein properties of the event indicator 825 are based on attributes of the event.

In some embodiments, a user of the event detection system 124 may provide an input that selects an event indicator, such as the event indicator 825, and the event detection system 124 may update the GUI 800 to present the corresponding sensor data from the event. For example, updating the GUI 800 may include presenting a segment of the video streams 805 and 810 based on temporal attributes of the event associated with the event indicator 825.

In further embodiments, the GUI 800 may also include a map image 830. The map image 830 comprises indications of locations corresponding to the events from the event log. For example, the event indicator 825 comprises an identifier ("A") that is also presented at a location that corresponds with the event indicator 825 on the map image 830. A user may therefore determine where the event associated with the event indicator occurred based on the position of the identifier within the map image 830.

Figure 9:
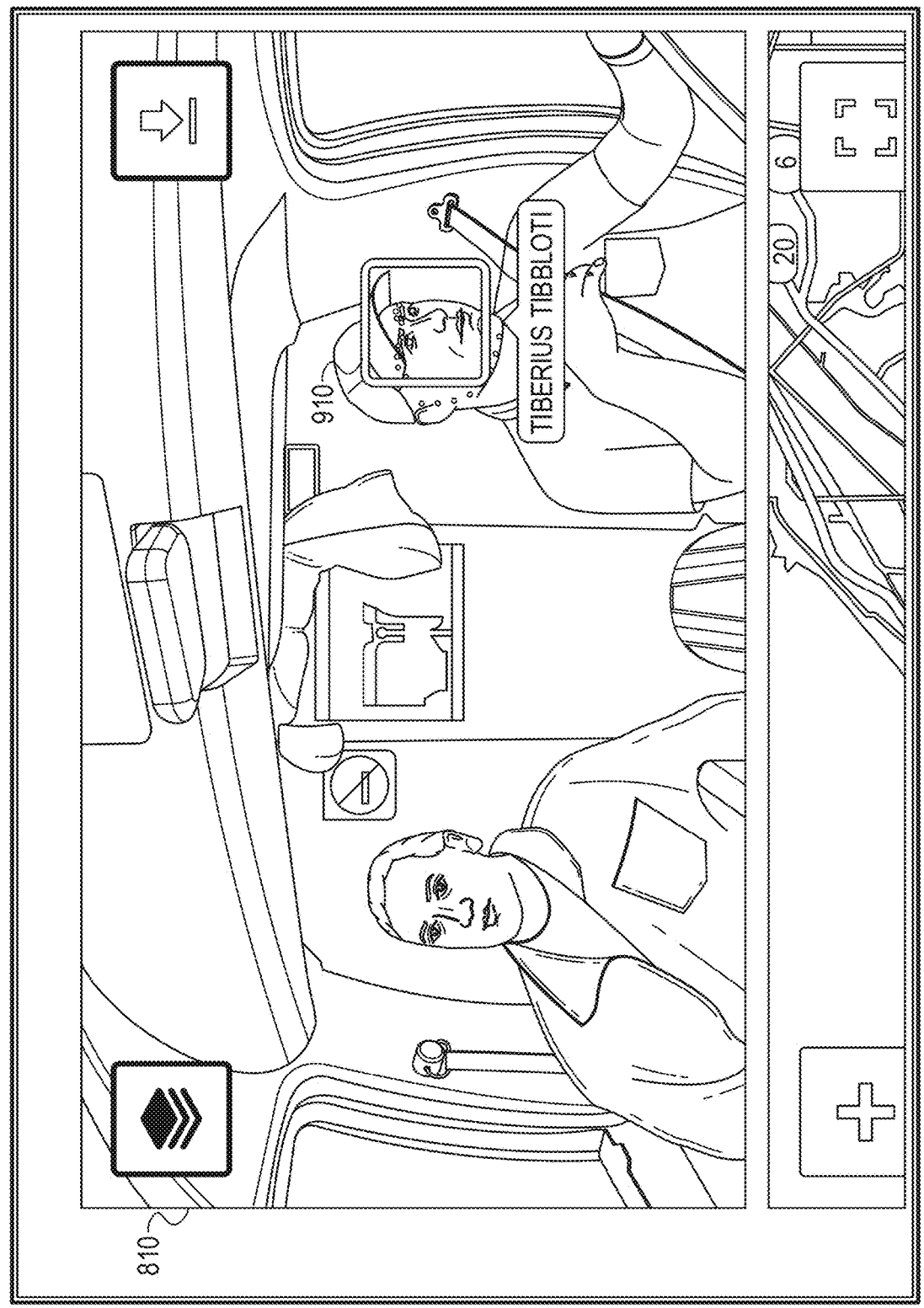
FIG. 9 is an interface diagram depicting sensor data from one or more sensor devices, according to certain example embodiments.

FIG. 9 is an interface diagram depicting sensor data 900 from one or more sensor devices 102, according to certain example embodiments. As seen in FIG. 9, the sensor data 900 may include the video stream 810 depicted in FIG. 8 The video stream 810 includes video data from a dashcam.

In some embodiments, a dashcam may be positioned to record video of a driver of a vehicle. Based on receiving the video data from the dashcam, the event detection system 124 may perform facial recognition to the video data to identify one or more occupants of the vehicle. Based on identifying the one or more occupants of the vehicle based on the video data, the event detection system 124 may present an identification 910 that includes a display of an identifier of an occupant of the vehicle.

Figure 10:
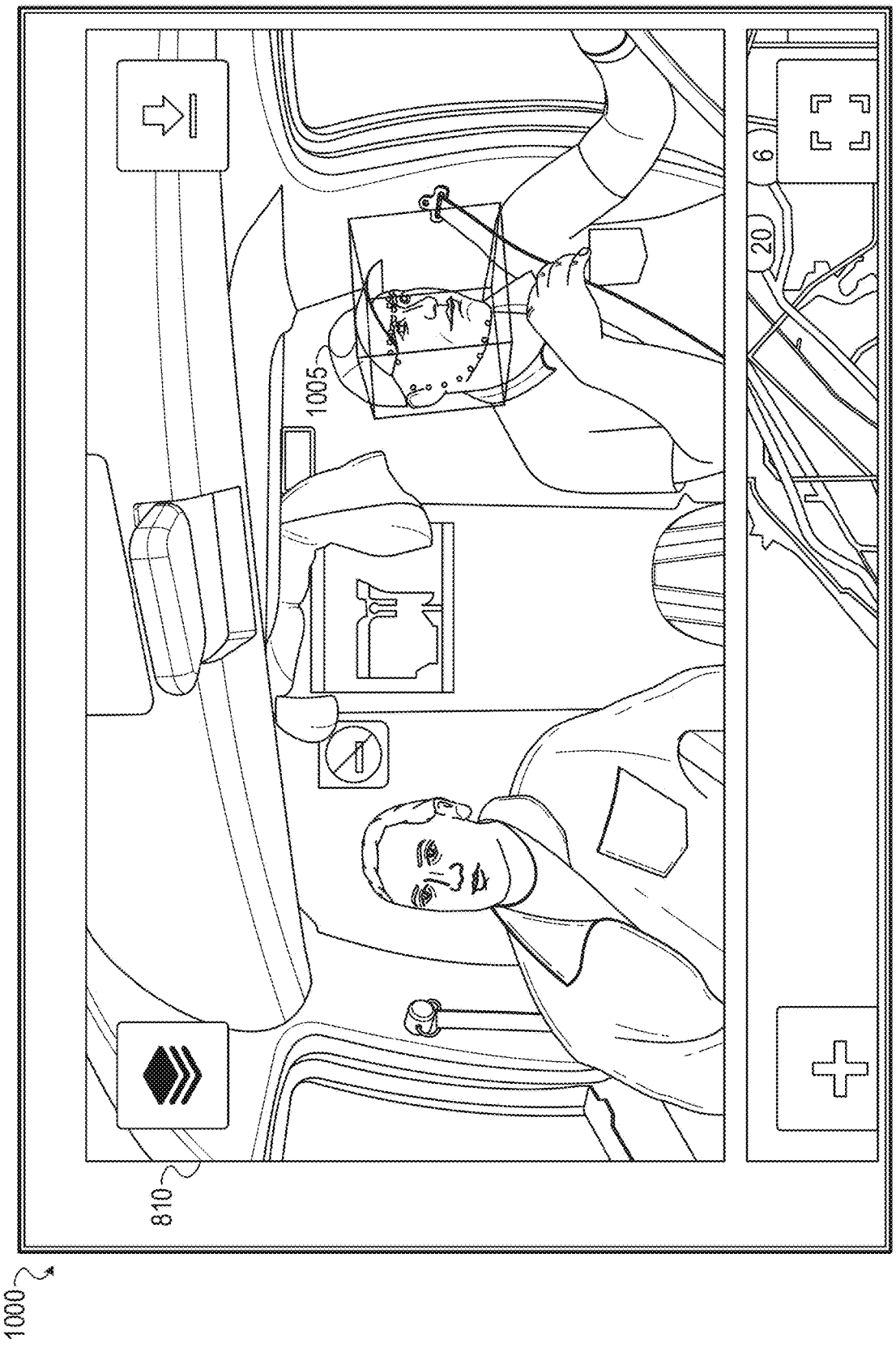
FIG. 10 is an interface diagram depicting sensor data from one or more sensor devices, according to certain example embodiments.

FIG. 10 is an interface diagram depicting sensor data 1000 from one or more sensor devices 102, according to certain example embodiments. As seen in FIG. 9, the sensor data 1000 may include the video stream 810 depicted in FIG. 8. The video stream 810 includes video data from a dashcam.

In some embodiments, a dashcam may be positioned to record video of a driver of a vehicle. Based on receiving the video data from the dashcam, the event detection system 124 may perform gaze detection on the video data to determine a point of attention of an occupant of the vehicle. Based on performing the gaze detection on the video data, the event detection system 124 may cause display of the gaze indicator 1005 within the video stream 810.

Figure 11:
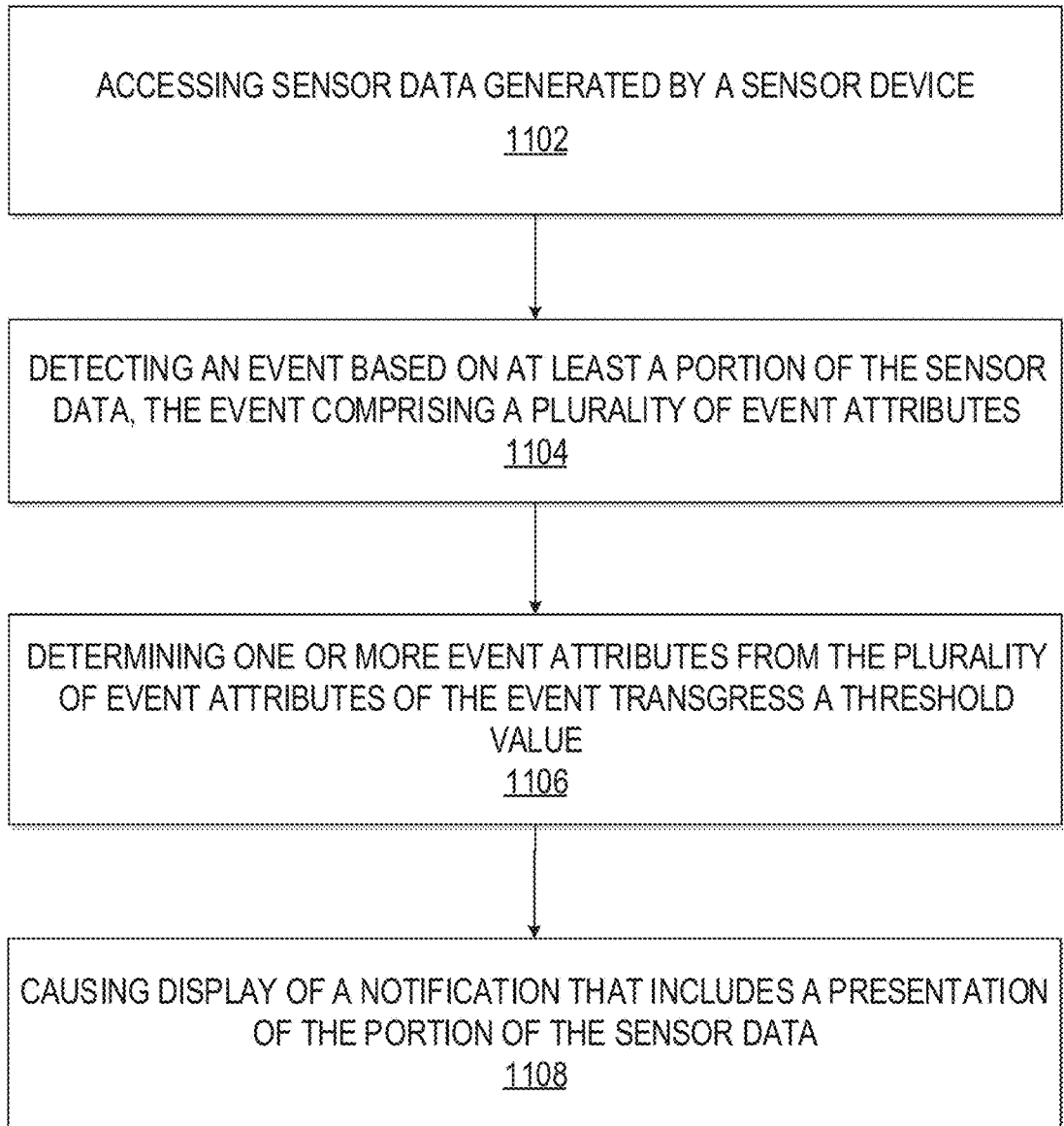
FIG. 11 is a flowchart depicting a method of causing display of a notification responsive to an event, according to certain example embodiments.

FIG. 11 is a flowchart depicting a method 1100 of causing display of a notification responsive to an event, according to certain example embodiments. Operations of the method 1100 may be performed by the modules described above with respect to FIG. 2.

At operation 1102, the sensor data module 202 accesses sensor data generated by one or more sensor devices. The sensor device may include a GPS system, an accelerometer, as well as a dashcam, such as an inward/cabin facing dashcam to capture images of a driver of a vehicle, as well as a forward facing dashcam, to capture images in front of the vehicle.

At operation 1104, the sensor data module 202 detects an event based on a portion of the sensor data generated by the one or more sensor devices. The event may comprise a plurality of event attributes, such as a duration of the event, and a distance to collision, or a time-to-collision. In some embodiments, the event attributes may also include location data, temporal data, as well as an identifier associated with a driver of the vehicle, an identifier associated with the one or more sensor devices, as well as an identifier associated with the vehicle.

At operation 1106, the sensor data module 202 determines that one or more of the event attributes from among the plurality of event attributes of the event transgresses a threshold value. For example, the threshold may be a distance value, or a temporal value. Responsive to the sensor data module 202 determining that the one or more event attributes of the event transgresses the threshold value, at operation 1108, the presentation module 208 generates and causes display of a notification that includes a presentation of a portion of the sensor data. For example, the portion of the sensor data may include a video clip depicting the event. In some embodiments, the presentation of the sensor data within the notification may include a display of an identifier associated with the sensor device, such as a device identifier, a vehicle identifier, and a user identifier.

In some embodiments, the notification may include an auditory, haptic or visible alert presented at the vehicle. As an illustrative example, responsive to detecting an event such as a lane-departure, a distracted driving event, or a near collision warning event, the event detection system may present an alert to notify a driver of the vehicle. For example, the presentation module 208 may be communicatively coupled with an alerting device, wherein the alerting device may be configured to present an auditory, haptic, or visual alert.

Figure 12:
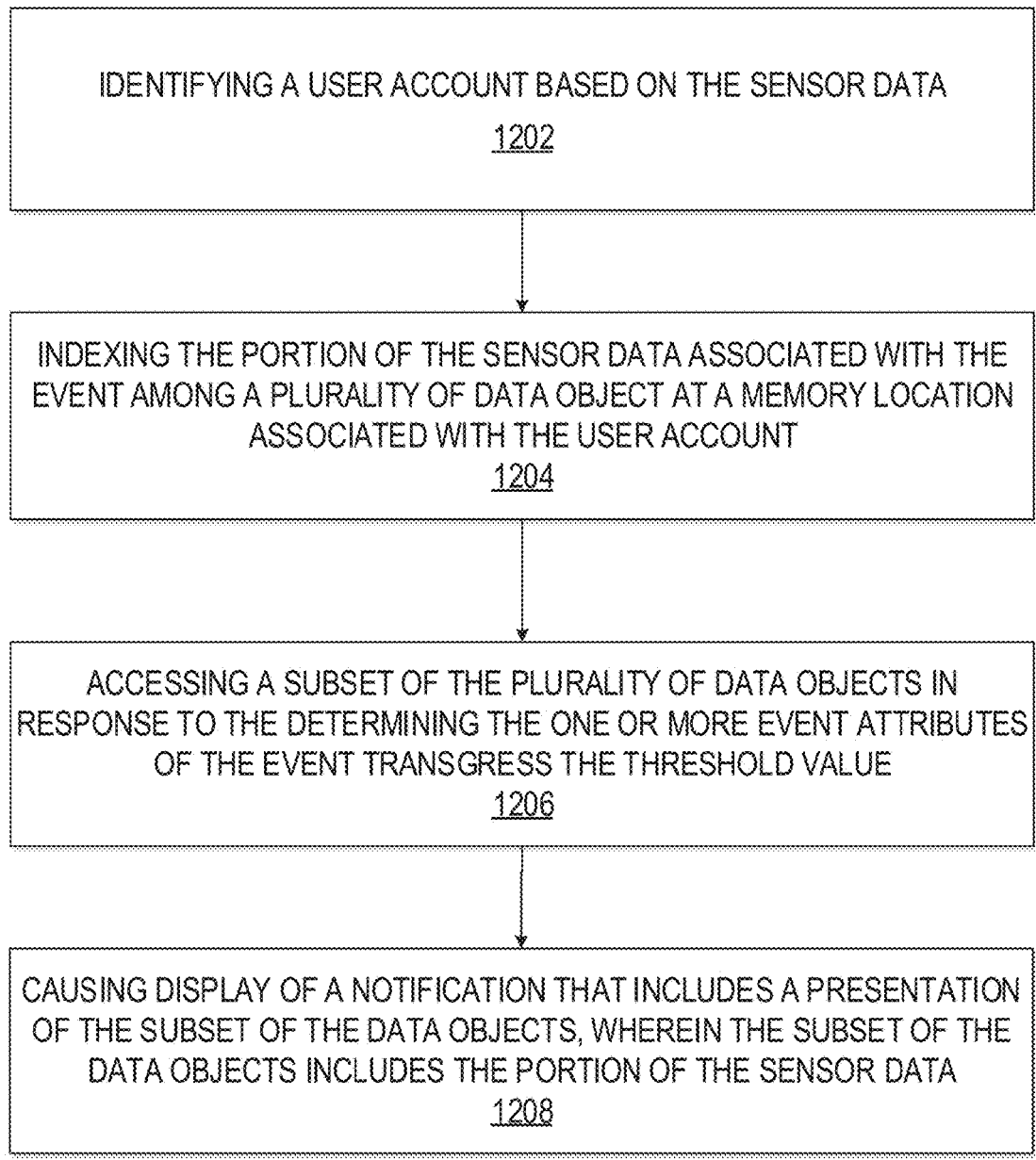
FIG. 12 is a flowchart depicting a method of causing display of a notification responsive to an event, according to certain example embodiments.

FIG. 12 is a flowchart depicting a method 1200 of causing display of a notification responsive to an event, according to certain example embodiments. Operations of the method 1200 may be performed by the modules described above with respect to FIG. 2.

At operation 1202, the sensor data module 202 identifies a user account based on the sensor data. For example, the sensor data generated by the one or more sensor devices may include image data that comprises a set of facial features useable by the sensor data module 202 to perform facial recognition. Accordingly, a user account may be identified based on facial recognition techniques. In some embodiments, the sensor data generated by the one or more sensor devices may comprise metadata that includes a device identifier, wherein the device identifier is associated with a user account within a database.

At operation 1204, the sensor data module 202 indexes a portion of the sensor data associated with the event among a plurality of data objects at a memory location associated with the user account identified at operation 1202. For example, the memory location may be associated with a user profile of the user account and include a plurality of data objects representative of events in which the user account was involved (i.e., as a driver, passenger).

At operation 1206, the sensor data module 202 accesses a subset of the plurality of data objects from the memory location associated with the user account responsive to determining that one or more event attributes of an event detected by the sensor data module 202 transgresses a threshold value. Accordingly, the subset of the plurality of data objects may include the portion of the data stream associated with the detected event.

At operation 1208, the presentation module 208 generates and causes display of a notification that includes a presentation of the subset of the data objects. For example, the notification may comprise a listing of similar events to the event detected by the sensor data module 202.

Figure 13:
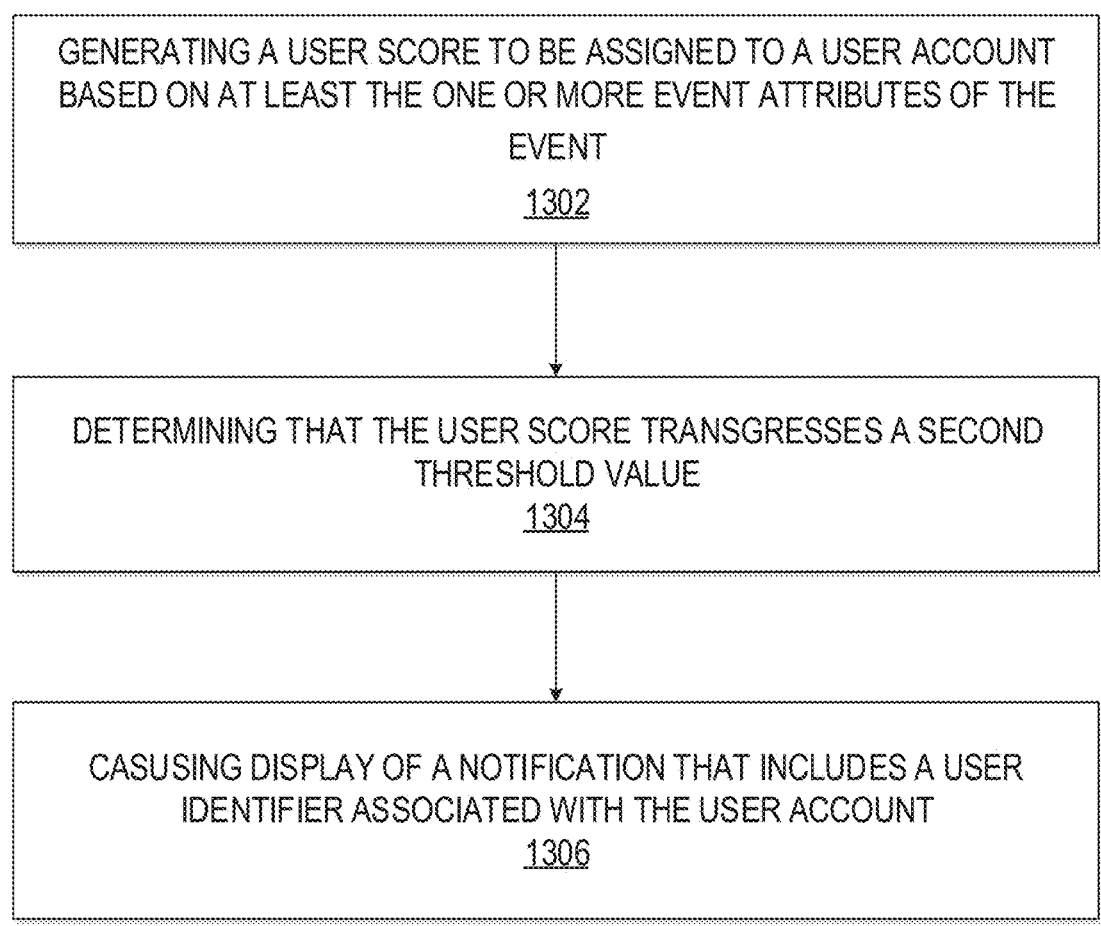
FIG. 13 is a flowchart depicting a method of causing display of a notification responsive to an event, according to certain example embodiments.

FIG. 13 is a flowchart depicting a method 1300 of causing display of a notification responsive to an event, according to certain example embodiments. Operations of the method 1300 may be performed by the modules described above with respect to FIG. 2. According to certain example embodiments, the method 1300 may be performed as a subroutine of operations 1108 of FIG. 11, 1208 of FIG. 12, as well as 1404 of FIG. 14.

At operation 1302, the sensor data module 202 generates a user score to be assigned to the user account based on one or more event attributes of a plurality of events listed at the memory location associated with the user account (i.e., a user profile). As discussed in the method 1200, the user profile may contain a listing of all events and corresponding event attributes, of events in which the user account was involved. For example, a user associated with the user account may have been a driver or passenger during one of the above-mentioned events. Accordingly, the user score may simply be a total number of events, or a total number of a certain type of event.

At operation 1304, the sensor data module 202 determines that the user score associated with the user account transgresses a threshold value. For example, the threshold value may indicate a total number of events of a particular event type (i.e., 3 near collision warning events).

At operation 1306, responsive to determining that the user score associated with the user account transgresses the threshold value, the presentation module 208 generates and causes display of a notification that includes a user identifier associated with the user account.

Figure 14:
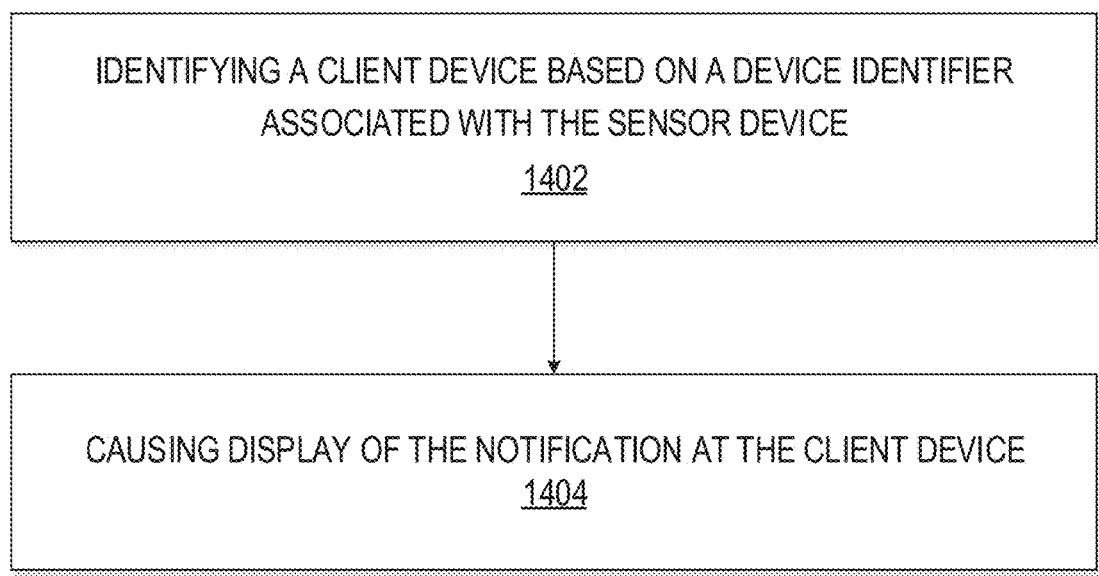
FIG. 14 is a flowchart depicting a method of causing display of a notification responsive to an event, according to certain example embodiments.

FIG. 14 is a flowchart depicting a method 1400 of causing display of a notification responsive to an event, according to certain example embodiments. Operations of the method 1400 may be performed by the modules described above with respect to FIG. 2.

At operation 1402, responsive to the sensor data module 202 detecting an event based on a portion of the sensor data stream generated by the one or more sensor devices, the communication module 206 identifies one or more client devices. For example, the one or more client devices identified by the communication module 206 may be associated with the sensor device at a memory repository. In some embodiments, the one or more client devices may be associated with the one or more sensor devices, as well as one or more events. As an illustrative example, the event detection system 124 may be configured to notify an administrator or manager associated with a particular deployment (a collection of sensor devices), responsive to detecting an event. Accordingly, the event detection system 124 may be configured to notify certain devices responsive to certain events, based on event attributes of the events.

At operation 1404, the presentation module 308 generates and causes display of a notification at the one or more client devices. The notification may include a display of a portion of the sensor data stream, as well as an identification of a user account, a location in which the event occurred, and temporal data indicating when the event occurred.

Figure 15:
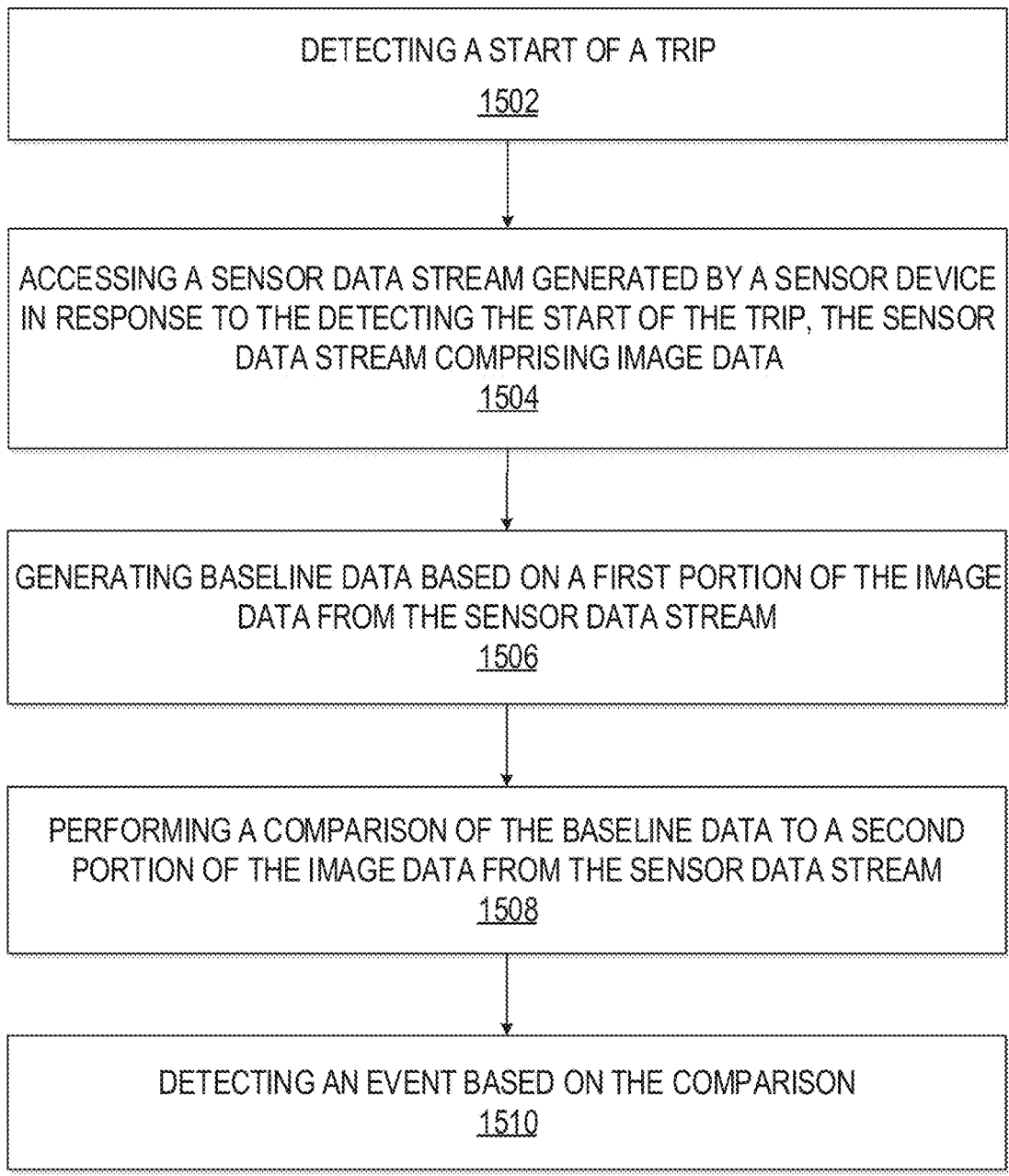
FIG. 15 is a flowchart depicting a method of detecting an event based on baseline data, according to certain example embodiments.

FIG. 15 is a flowchart depicting a method 1500 of detecting an event based on baseline data, according to certain example embodiments. Operations of the method 1500 may be performed by the modules described above with respect to FIG. 2.

At operation 1502, the communication module 206 detects a start of a trip. For example, a start of a trip may be determined based on determining that an ignition of a vehicle associated with the one or more sensor devices has been keyed on. In some embodiments, the start of the trip may be determined based on GPS data indicating that a vehicle begins moving, or in some embodiments, responsive to determining that the vehicle has started along a route to a destination generated by a GPS.

At operation 1504, responsive to the communication module 206 detecting the start of the trip, the sensor data module 302 accesses a sensor data stream generated by one or more sensor devices. In some embodiments, the sensor data stream may include image data, as well as accelerometer data.

At operation 1506, the sensor data module 302 generates a baseline data set based on a first portion of the data stream. For example, the first portion of the sensor data stream may be defined as sensor data generated by the one or more sensor devices over a predefined period of time, a predefined geographic location, a predefined distance originating at the start of the trip, or based on explicit user input that selects the first portion of the sensor data stream.

At operation 1508, the sensor data module 302 performs a comparison of the baseline data to a second portion of the sensor data stream. Based on the comparison, at operation 1510, the sensor data module 302 detects an event.

Figure 16:
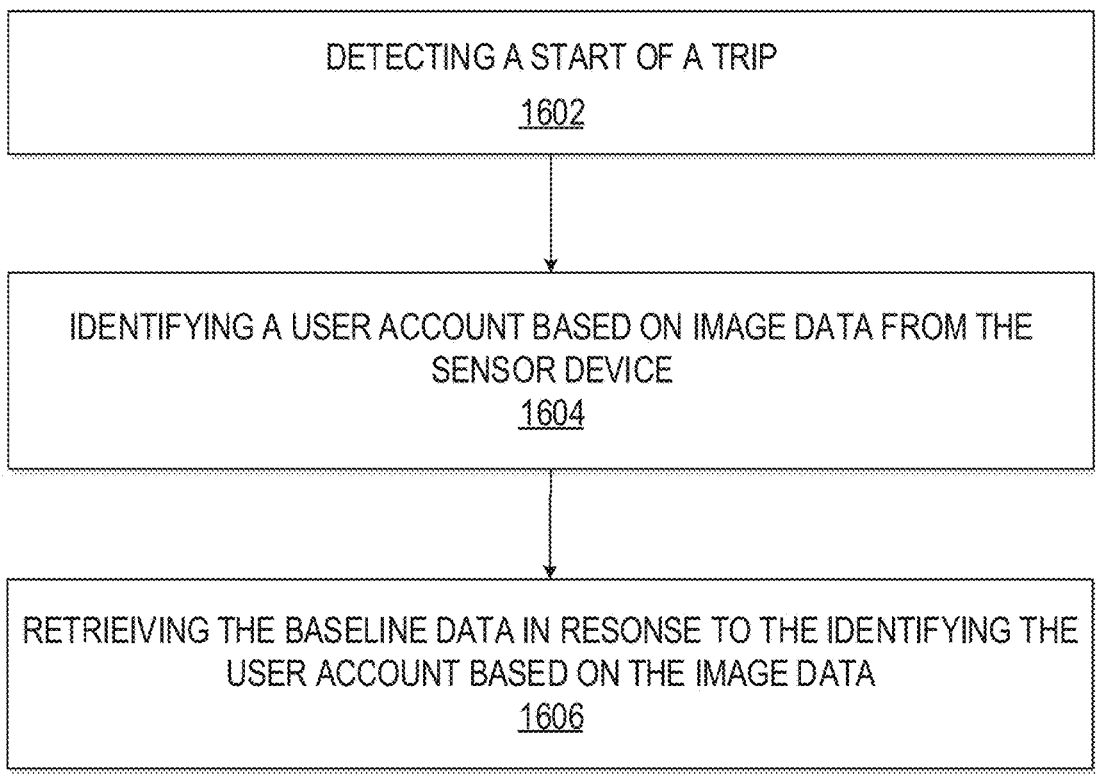
FIG. 16 is a flowchart depicting a method of detecting an event based on baseline data, according to certain example embodiments.

FIG. 16 is a flowchart depicting a method 1600 of detecting an event based on baseline data, according to certain example embodiments. Operations of the method 1600 may be performed by the modules described above with respect to FIG. 2.

At operation 1602, as in operation 1502, the communication module 206 detects a start of a trip. As discussed above in operation 1502, a start of a trip may be determined based on determining that an ignition of a vehicle associated with the one or more sensor devices has been keyed on. In some embodiments, the start of the trip may be determined based on GPS data indicating that a vehicle begins moving, or in some embodiments, responsive to determining that the vehicle has started along a route to a destination generated by a GPS.

At operation 1604, the sensor data module 302 accesses a sensor data stream generated by one or more sensor devices, wherein the sensor data may include image data. The sensor data module 302 identifies a user account based on the sensor data stream.

At operation 1606, responsive to identifying the user account, the sensor data module 302 retrieves a baseline data set associated with the user account.

Figure 17:
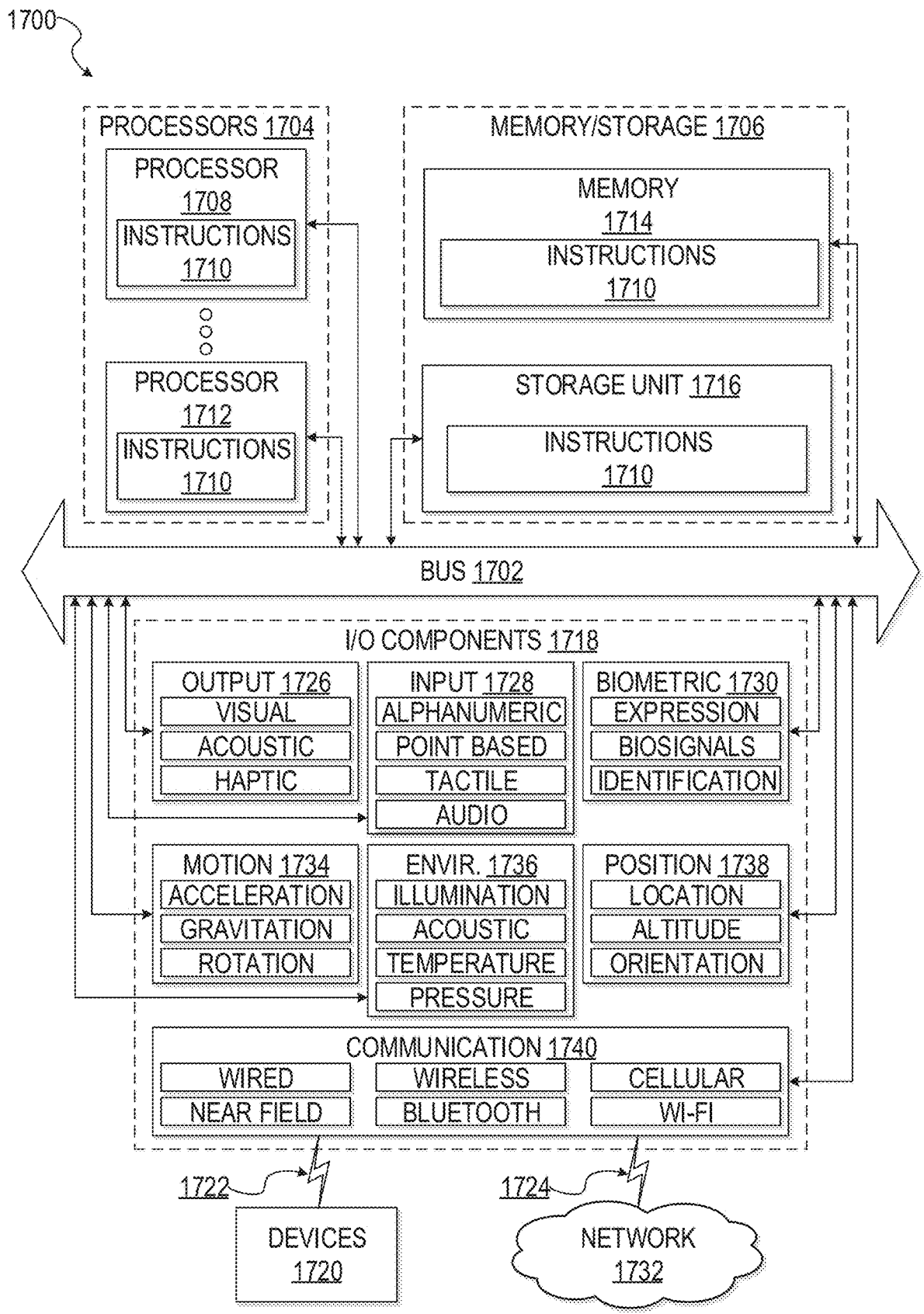
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of processors 1704 are examples of machine-readable media.

The I/O components 1718 may include a wide variety of components to receive input, provide output, produce output, transmit information, exchange information, capture measurements, and so on. The specific I/O components 1718 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environmental environment components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via coupling 1722 and coupling 1724 respectively. For example, the communication components 1740 may include a network interface component or other suitable device to interface with the network 1732. In further examples, communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a Universal Serial Bus (USB)).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:

accessing sensor data generated by a sensor device that includes a dashcam, the sensor device corresponding with a device identifier detecting an event based on at least a portion of the sensor data that includes image data, the event comprising a plurality of event attributes, and a set of notification triggers that include detection of one or more image features within the sensor data generated by the sensor device;

detecting the one or more image features associated with a notification trigger from among the set of notification triggers within the image data generated by the dashcam, the notification trigger corresponding with a notification type that comprises one or more notification features;

identifying a user account based on the device identifier of the sensor device responsive to the notification trigger, the user account corresponding with a client device;

generating a user score to be assigned to the user account based on the plurality of event attributes of the event;

determining that the user score transgresses a threshold value;

generating a notification based on the notification type that correspond with the notification trigger of the event responsive to the detecting the one or more image features, the notification including a user identifier associated with the user account, the one or more notification features that correspond with the notification type, and a presentation of the portion of the sensor data; and causing display of the notification at the client device associated with the user account.

2. The method of claim 1, wherein the sensor data includes image data that comprises image features, and the detecting the event based on the portion of the sensor data includes:

detecting the event based on the image features of the image data.

3. The method of claim 1, wherein the presentation of the portion of the sensor data includes an indication of the one or more event attributes of the event.

4. The method of claim 1, wherein the generating the user score includes:

indexing the portion of the sensor data associated with the event among a plurality of data objects at a memory location associated with the user account;

accessing a subset of the data objects at the memory location in response to the detecting the event, the subset of the data objects including the portion of the sensor data; and generating the user score based on at least the subset of the data objects.

5. The method of claim 1, wherein the event includes a near-collision, and the one or more event attributes include a time-to-collision.

6. The method of claim 1, wherein the sensor device includes a device identifier, and the causing display of the notification that includes the presentation of the portion of the sensor data based on the result of the comparison includes:

identifying the client device based on the device identifier of the sensor device; and causing display of the notification at the client device.

7. The method of claim 1, wherein the sensor device includes a camera and the image data includes video data.

8. A system comprising:

at least one sensor device to generate sensor data comprising a plurality of data streams;

a memory; and at least one hardware processor to perform operations comprising:

accessing sensor data generated by a sensor device that includes a dashcam, the sensor device corresponding with a device identifier detecting an event based on at least a portion of the sensor data that includes image data, the event comprising a plurality of event attributes, and a set of notification triggers that include detection of one or more image features within the sensor data generated by the sensor device;

detecting the one or more image features associated with a notification trigger from among the set of notification triggers within the image data generated by the dashcam, the notification trigger corresponding with a notification type that comprises one or more notification features;

identifying a user account based on the device identifier of the sensor device responsive to the notification trigger, the user account corresponding with a client device;

generating a user score to be assigned to the user account based on the plurality of event attributes of the event;

determining that the user score transgresses a threshold value;

generating a notification based on the notification type that correspond with the notification trigger of the event responsive to the detecting the one or more image features, the notification including a user identifier associated with the user account, the one or more notification features that correspond with the notification type, and a presentation of the portion of the sensor data; and causing display of the notification at the client device associated with the user account.

9. The system of claim 8, wherein the sensor data includes image data that comprises image features, and the detecting the event based on the portion of the sensor data includes:

detecting the event based on the image features of the image data.

10. The system of claim 8, wherein the presentation of the portion of the sensor data includes an indication of the one or more event attributes of the event.

11. The system of claim 8, wherein the generating the user score includes:

indexing the portion of the sensor data associated with the event among a plurality of data objects at a memory location associated with the user account;

accessing a subset of the data objects at the memory location in response to the detecting the event, the subset of the data objects including the portion of the sensor data; and generating the user score based on at least the subset of the data objects.

12. The system of claim 8, wherein the event includes a near-collision, and the event attributes include a time-to-collision.

13. The system of claim 8, wherein the sensor device includes a device identifier, and the causing display of the notification that includes the presentation of the portion of the sensor data based on the result of the comparison includes:

identifying the client device based on the device identifier of the sensor device; and causing display of the notification at the client device.

14. The system of claim 8, wherein the sensor device includes a camera and the image data includes video data.

15. A non-transitory machine-readable storage medium comprising instructions that, when executed by one or more processors of a machine, cause the machine to perform operations comprising:

accessing sensor data generated by a sensor device that includes a dashcam, the sensor device corresponding with a device identifier detecting an event based on at least a portion of the sensor data that includes image data, the event comprising a plurality of event attributes, and a set of notification triggers that include detection of one or more image features within the sensor data generated by the sensor device;

detecting the one or more image features associated with a notification trigger from among the set of notification triggers within the image data generated by the dashcam, the notification trigger corresponding with a notification type that comprises one or more notification features;

identifying a user account based on the device identifier of the sensor device responsive to the notification trigger, the user account corresponding with a client device;

generating a user score to be assigned to the user account based on the plurality of event attributes of the event;

determining that the user score transgresses a threshold value;

generating a notification based on the notification type that correspond with the notification trigger of the event responsive to the detecting the one or more image features, the notification including a user identifier associated with the user account, the one or more notification features that correspond with the notification type, and a presentation of the portion of the sensor data; and causing display of the notification at the client device associated with the user account.

16. The non-transitory machine-readable storage medium of claim 15, wherein the sensor data includes image data that comprises image features, and the detecting the event based on the portion of the sensor data includes:

detecting the event based on the image features of the image data.

17. The non-transitory machine-readable storage medium of claim 15, wherein the presentation of the portion of the sensor data includes an indication of the one or more event attributes of the event.

18. The non-transitory machine-readable storage medium of claim 15, wherein the generating the user score includes:

indexing the portion of the sensor data associated with the event among a plurality of data objects at a memory location associated with the user account;

accessing a subset of the data objects at the memory location in response to the detecting the even, the subset of the data objects including the portion of the sensor data; and generating the user score based on at least the subset of the data objects.

\* \* \* \* \*